US012189384B2

(12) United States Patent
Morgan et al.

(10) Patent No.: US 12,189,384 B2
(45) Date of Patent: Jan. 7, 2025

(54) PREDICTIVE BLOCK MAINTENANCE

(71) Applicant: Typhon Technology Solutions (U.S.), LLC, The Woodlands, TX (US)

(72) Inventors: Lee Morgan, Richmond, TX (US); Michael Garza-Pena, San Antonio, TX (US); Connor Moore Sinclair, The Woodlands, TX (US); Matthew James Vahsholtz, Conroe, TX (US); Valencia Loyd, Spring, TX (US); Nicholas Fornicola, Howard, PA (US)

(73) Assignee: Typhon Technology Solutions (U.S.), LLC, The Woodlands, TX (US)

( * ) Notice: Subject to any disclaimer, the term of this patent is extended or adjusted under 35 U.S.C. 154(b) by 115 days.

(21) Appl. No.: 17/891,556

(22) Filed: Aug. 19, 2022

(65) Prior Publication Data

US 2024/0061417 A1 Feb. 22, 2024

(51) Int. Cl.
*G05B 23/02* (2006.01)
*E21B 49/08* (2006.01)

(52) U.S. Cl.
CPC ........ *G05B 23/0283* (2013.01); *E21B 49/087* (2013.01); *G05B 23/024* (2013.01)

(58) Field of Classification Search
CPC ............ G05B 23/0283; G05B 23/0294; G05B 23/024; G05B 2219/25419; G05B 2219/32233; G05B 2219/32234; E21B 49/087; E21B 43/283; E21B 43/2607; E21B 41/0092; E21B 47/008; G08B 21/182; G06Q 10/20; G06Q 10/06316
See application file for complete search history.

(56) References Cited

U.S. PATENT DOCUMENTS

2002/0143421 A1 10/2002 Wetzer
2008/0208478 A1 8/2008 Ella et al.
(Continued)

FOREIGN PATENT DOCUMENTS

WO WO 2020/097060 A2 5/2020

OTHER PUBLICATIONS

PCT International Search Report and Written Opinion, PCT Application No. PCT/US2022/40866, Dec. 23, 2022, 10 pages.

*Primary Examiner* — Son T Le
*Assistant Examiner* — Matthew W. Baca
(74) *Attorney, Agent, or Firm* — Fenwick & West LLP

(57) ABSTRACT

Well completion design data for completing plural stages of a well completion operation is accessed. Predicted component life intervals for each of a plurality of components of a frac fleet are accessed. Remaining component life intervals for each of the plurality of components of the frac fleet are determined based on the predicted component life intervals. A continuous completion event for the well completion operation is set based on the remaining component life intervals for each of the plurality of components. The continuous completion event includes a continuous pumping block identifying one or more contiguous stages from among the plurality of stages during which the well completion operation is performed with the frac fleet, and a maintenance block identifying one or more of the plurality of frac pumps to be subject to predetermined maintenance operations upon completion of the one or more contiguous stages of the continuous pumping block.

17 Claims, 10 Drawing Sheets

(56) References Cited

U.S. PATENT DOCUMENTS

| | | | |
|---|---|---|---|
| 2012/0203507 A1* | 8/2012 | Thomeer | E21B 41/00 |
| | | | 702/183 |
| 2019/0018394 A1 | 1/2019 | Sayyarrodsari et al. | |
| 2020/0300065 A1* | 9/2020 | Christinzio | G06Q 10/20 |
| 2021/0025267 A1* | 1/2021 | Christie | E21B 43/26 |
| 2021/0396119 A1* | 12/2021 | Yeung | F04B 49/065 |
| 2022/0003229 A1* | 1/2022 | Mu | F04B 49/065 |
| 2022/0317676 A1* | 10/2022 | Reaume | G06Q 10/20 |

* cited by examiner

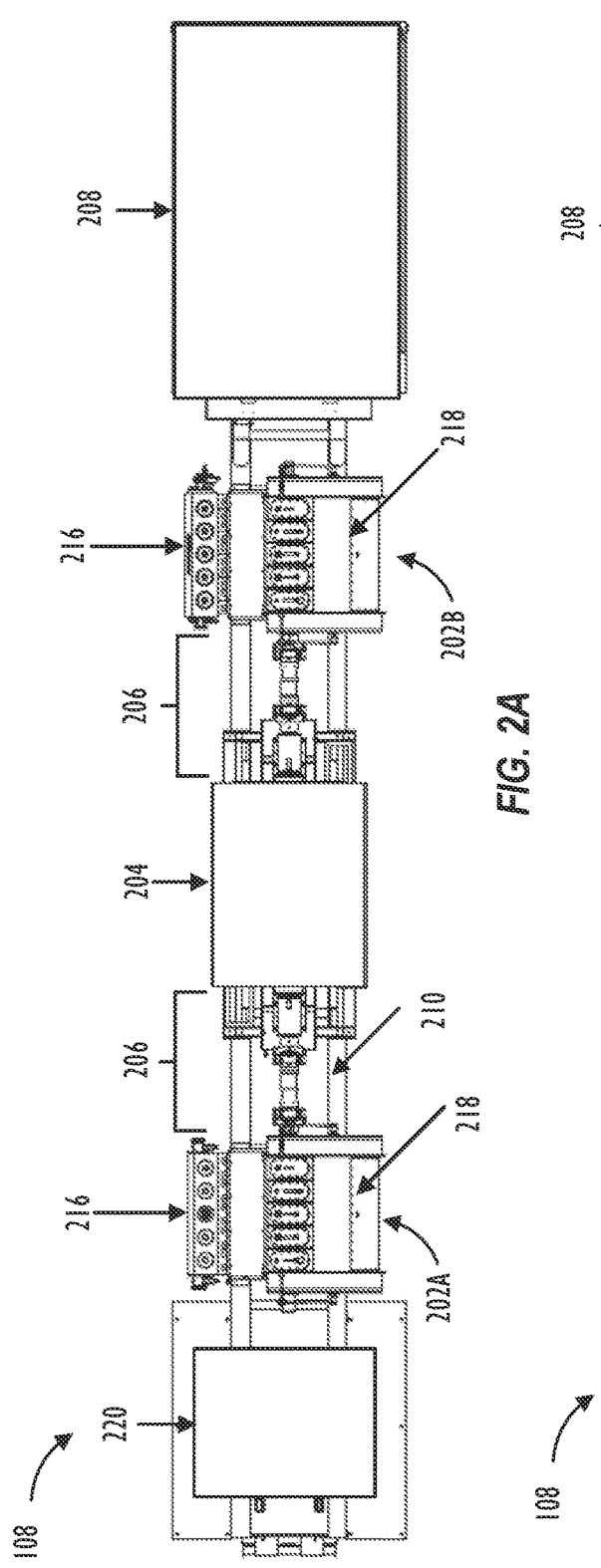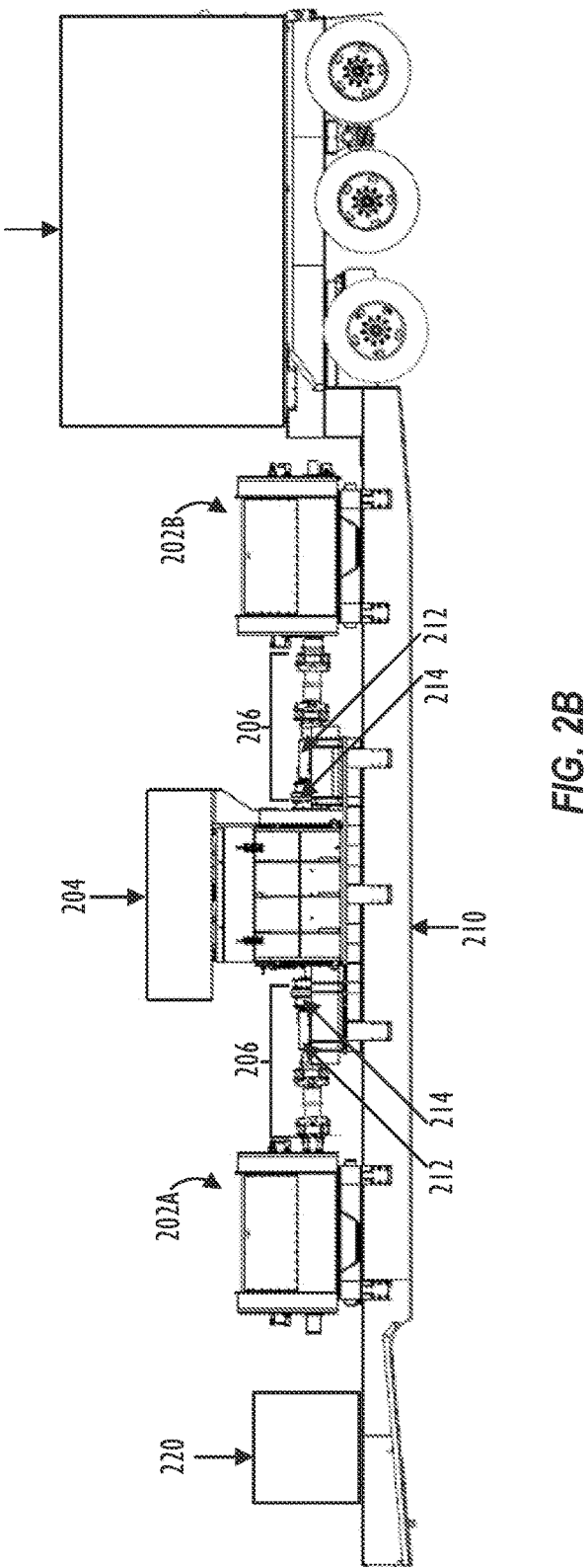
FIG. 2A
FIG. 2B

| Stage Number | Well Name | Well Stage | Well A | Well B | Well C | Design Time |
|---|---|---|---|---|---|---|
| 1 | Well A | 1 | 5398 | | | 1.12 |
| 2 | Well B | 1 | | 6532 | | 1.36 |
| 3 | Well C | 1 | | | 6523 | 1.36 |
| 4 | Well A | 2 | 6261 | | | 1.30 |
| 5 | Well C | 2 | | | 8192 | 1.71 |
| 6 | Well A | 3 | 6261 | | | 1.30 |
| 7 | Well B | 2 | | 7642 | | 1.59 |
| 8 | Well A | 4 | 6261 | | | 1.30 |
| 9 | Well C | 3 | | | 6954 | 1.45 |
| 10 | Well A | 5 | 7403 | | | 1.54 |
| 11 | Well B | 3 | | 7218 | | 1.50 |
| 12 | Well A | 6 | 7403 | | | 1.54 |
| 13 | Well C | 4 | | | 6954 | 1.45 |
| 14 | Well A | 7 | 7403 | | | 1.54 |
| 15 | Well B | 4 | | 7218 | | 1.50 |
| 16 | Well A | 8 | 7403 | | | 1.51 |
| 17 | Well B | 5 | | 8378 | | 1.75 |
| 18 | Well A | 9 | 7418 | | | 1.55 |
| 19 | Well C | 5 | | | 8448 | 1.76 |
| 20 | Well A | 10 | 7403 | | | 1.50 |

*FIG. 6*

| Stage Number | Well Name | Well Stage | Well A | Well B | Well C | Design Time |
|---|---|---|---|---|---|---|
| 1 | Well A | 1 | 5398 | | | 1.12 |
| 2 | Well B | 1 | | 6532 | | 1.36 |
| 3 | Well C | 1 | | | 6523 | 1.36 |
| 4 | Well A | 2 | 6261 | | | 1.30 |
| 5 | Well C | 2 | | | 8192 | 1.71 |
| 6 | Well A | 3 | 6261 | | | 1.30 |
| 7 | Well B | 2 | | 7642 | | 1.59 |
| 8 | Well A | 4 | 6261 | | | 1.30 |
| 9 | Well C | 3 | | | 6954 | 1.45 |
| 10 | Well A | 5 | 7403 | | | 1.54 |
| 11 | Well B | 3 | | 7218 | | 1.50 |
| 12 | Well A | 6 | 7403 | | | 1.54 |
| 13 | Well C | 4 | | | 6954 | 1.45 |
| 14 | Well A | 7 | 7403 | | | 1.54 |
| 15 | Well B | 4 | | 7218 | | 1.50 |
| MAINTENANCE EVENT: CHANGE VALVES, SEATS, AND PACKINGS FOR FRAC PUMP # 003 & 007 | | | | | | |
| 16 | Well A | 8 | 7403 | | | 1.51 |
| 17 | Well B | 5 | | 8378 | | 1.75 |
| 18 | Well A | 9 | 7418 | | | 1.55 |
| 19 | Well C | 5 | | | 8448 | 1.76 |
| 20 | Well A | 10 | 7403 | | | 1.50 |

ACCESS PUMP MAINTENANCE DATA ASSOCIATED WITH EACH OF A PLURALITY OF COMPONENTS OF EACH OF A PLURALITY OF FRAC PUMPS OF EACH OF A PLURALITY OF FRAC PUMP TRANSPORTS OF A FRAC FLEET, WHEREIN THE PUMP MAINTENANCE DATA INCLUDES USAGE DATA OF A PLURALITY OF WELL COMPLETION OPERATIONS PERFORMED BY THE FRAC FLEET, AND WHEREIN THE USAGE DATA INDICATES ACTUAL COMPONENT LIFE INTERVALS OF EACH OF THE PLURALITY OF COMPONENTS AND CORRESPONDING OPERATING CONDITIONS 810

ANALYZE THE PUMP MAINTENANCE DATA TO GENERATE A MAINTENANCE PREDICTION MODEL, THE MAINTENANCE PREDICTION MODEL BEING CONFIGURED TO OUTPUT FOR EACH OF THE PLURALITY OF COMPONENTS, A PREDICTED COMPONENT LIFE INTERVAL AS A FUNCTION OF AN OPERATING CONDITION 820

ACCESS A CURRENT OPERATING CONDITION CORRESPONDING TO A CURRENT WELL COMPLETION OPERATION OF THE FRAC FLEET 830

APPLY THE MAINTENANCE PREDICTION MODEL FOR THE CURRENT WELL COMPLETION OPERATION TO GENERATE THE PREDICTED COMPONENT LIFE INTERVALS FOR EACH OF THE PLURALITY OF COMPONENTS OF THE FRAC FLEET BASED ON THE CURRENT OPERATING CONDITION 840

TRACK A CURRENT COMPONENT LIFE INDICATING USAGE OF A GIVEN COMPONENT IN AT LEAST THE CURRENT WELL COMPLETION OPERATION BASED ON SENSOR DATA 850

TRANSMIT A NOTIFICATION INDICATING A MAINTENANCE EVENT FOR THE GIVEN COMPONENT IN RESPONSE TO DETERMINING THAT THE TRACKED CURRENT COMPONENT LIFE FOR THE GIVEN COMPONENT HAS REACHED A CORRESPONDING PREDICTED COMPONENT LIFE INTERVAL 860

```
┌─────────────────────────────────────────────────────────────────────────┐
│ ACCESS WELL COMPLETION DESIGN DATA FOR COMPLETING A PLURALITY OF        │
│ STAGES OF A WELL COMPLETION OPERATION, THE WELL COMPLETION OPERATION    │
│ BEING PERFORMED WITH A FRAC FLEET INCLUDING A PLURALITY OF FRAC PUMP    │
│ TRANSPORTS, EACH FRAC PUMP TRANSPORT INCLUDING A PLURALITY OF FRAC      │
│ PUMPS, AND EACH FRAC PUMP INCLUDING A PLURALITY OF COMPONENTS 910       │
└─────────────────────────────────────────────────────────────────────────┘
                                    │
                                    ▼
┌─────────────────────────────────────────────────────────────────────────┐
│ ACCESS PREDICTED COMPONENT LIFE INTERVALS FOR EACH OF THE PLURALITY OF  │
│ COMPONENTS OF THE FRAC FLEET, THE PREDICTED COMPONENT LIFE INTERVALS    │
│ BEING OBTAINED FROM A MAINTENANCE PREDICTION MODEL ASSOCIATED WITH      │
│ THE FRAC FLEET 920                                                      │
└─────────────────────────────────────────────────────────────────────────┘
                                    │
                                    ▼
┌─────────────────────────────────────────────────────────────────────────┐
│ DETERMINE REMAINING COMPONENT LIFE INTERVALS FOR EACH OF THE PLURALITY  │
│ OF COMPONENTS OF THE FRAC FLEET BASED ON AT LEAST THE RESPECTIVE        │
│ PREDICTED COMPONENT LIFE INTERVALS 930                                  │
└─────────────────────────────────────────────────────────────────────────┘
                                    │
                                    ▼
┌─────────────────────────────────────────────────────────────────────────┐
│ SET A CONTINUOUS COMPLETION EVENT FOR THE WELL COMPLETION OPERATION     │
│ BASED ON THE REMAINING COMPONENT LIFE INTERVALS FOR EACH OF THE         │
│ PLURALITY OF COMPONENTS, THE CONTINUOUS COMPLETION EVENT INCLUDING A    │
│ CONTINUOUS PUMPING BLOCK AND A MAINTENANCE BLOCK, THE CONTINUOUS        │
│ PUMPING BLOCK IDENTIFYING ONE OR MORE CONTIGUOUS STAGES FROM AMONG      │
│ THE PLURALITY OF STAGES DURING WHICH THE WELL COMPLETION OPERATION IS   │
│ PERFORMED WITH THE FRAC FLEET, AND THE MAINTENANCE BLOCK IDENTIFYING    │
│ ONE OR MORE OF THE PLURALITY OF FRAC PUMPS TO BE SUBJECT TO             │
│ PREDETERMINED MAINTENANCE OPERATIONS UPON COMPLETION OF THE ONE OR      │
│ MORE CONTIGUOUS STAGES OF THE CONTINUOUS PUMPING BLOCK 940              │
└─────────────────────────────────────────────────────────────────────────┘
                                    │
                                    ▼
┌─────────────────────────────────────────────────────────────────────────┐
│ PERFORMING THE CONTINUOUS PUMPING BLOCK AND THE MAINTENANCE BLOCK OF    │
│ THE WELL COMPLETION EVENT FOR THE WELL COMPLETION OPEARTION 950         │
└─────────────────────────────────────────────────────────────────────────┘
```

*FIG. 9*

PREDICTIVE BLOCK MAINTENANCE

TECHNICAL FIELD

This disclosure relates generally to hydraulic fracturing. More particularly, but not by way of limitation, this disclosure relates to performing predictive block maintenance for a well completion design.

BACKGROUND

Hydraulic fracturing has been commonly used by the oil and gas industry to stimulate production of hydrocarbon wells, such as oil and/or gas wells. Hydraulic fracturing, sometimes called "fracing" or "fracking," is the process of injecting fracturing fluid, which is typically a mixture of water, sand, and chemicals, into the subsurface to fracture the subsurface geological formations and release otherwise encapsulated hydrocarbon reserves. The fracturing fluid is typically pumped into a wellbore at a relatively high pressure sufficient to cause fissures within the underground geological formations. Specifically, once inside the wellbore, the pressurized fracturing fluid is pressure pumped down and then out into the subsurface geological formation to fracture the underground formation. A fluid mixture that may include water, various chemical additives, and proppants (e.g., sand or ceramic materials) can be pumped into the underground formation to fracture and promote the extraction of the hydrocarbon reserves, such as oil and/or gas. For example, the fracturing fluid may comprise a liquid petroleum gas, linear gelled water, gelled water, gelled oil, slick water, slick oil, poly emulsion, foam/emulsion, liquid carbon dioxide, nitrogen gas, and/or binary fluid and acid.

Implementing large-scale fracturing operations at well sites typically require extensive investment in equipment, labor, and fuel. For instance, a typical fracturing operation uses a variety of fracturing equipment, numerous personnel to operate and maintain the fracturing equipment, large amounts of fuel to power the fracturing operations, and large volumes of fracturing fluids. As such, planning for fracturing operations is often complex and encompasses a variety of logistical challenges that include minimizing the on-site area or "footprint" of the fracturing operations, providing adequate power and/or fuel to continuously power the fracturing operations, increasing the efficiency of the hydraulic fracturing equipment, minimizing equipment downtime (e.g., non-productive time (NPT)), and reducing any environmental impact resulting from fracturing operations. Thus, numerous innovations and improvements of existing fracturing technology are needed to address the variety of complex and logistical challenges faced in today's fracturing operations.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a method includes a step of accessing well completion design data for completing a plurality of stages of a well completion operation, the well completion operation being performed with a frac fleet including a plurality of frac pump transports, each frac pump transport including a plurality of frac pumps, and each frac pump including a plurality of components. The method further includes a step of accessing predicted component life intervals for each of the plurality of components of the frac fleet, the predicted component life intervals being obtained from a maintenance prediction model associated with the frac fleet. The method further includes a step of determining remaining component life intervals for each of the plurality of components of the frac fleet based on at least the respective predicted component life intervals. Still further, the method includes a step of setting a continuous completion event for the well completion operation based on the remaining component life intervals for each of the plurality of components. The continuous completion event includes a continuous pumping block and a maintenance block, the continuous pumping block identifying one or more contiguous stages from among the plurality of stages during which the well completion operation is performed with the frac fleet, and the maintenance block identifying one or more of the plurality of frac pumps to be subject to predetermined maintenance operations upon completion of the one or more contiguous stages of the continuous pumping block.

In another embodiment, a system for performing predictive block maintenance is provided which comprises: a frac fleet including a plurality of frac pump transports, each frac pump transport including a plurality of frac pumps, and each frac pump including a plurality of components; memory; and one or more processors operatively coupled to the memory. The memory comprises instructions that, when executed by the one or more processors, cause the one or more processors to access well completion design data for completing a plurality of stages of a well completion operation with the frac fleet. The instructions further cause the one or more processors to access predicted component life intervals for each of the plurality of components of the frac fleet, the predicted component life intervals being obtained from a maintenance prediction model associated with the frac fleet. The instructions further cause the one or more processors to determine remaining component life intervals for each of the plurality of components of the frac fleet based on at least the respective predicted component life intervals. Still further, the instructions cause the one or more processors to set a continuous completion event for the well completion operation based on the remaining component life intervals for each of the plurality of components, the continuous completion event including a continuous pumping block and a maintenance block. The continuous pumping block identifies one or more contiguous stages from among the plurality of stages during which the well completion operation is performed with the frac fleet, and the maintenance block identifies one or more of the plurality of frac pumps to be subject to predetermined maintenance operations upon completion of the one or more contiguous stages of the continuous pumping block.

In yet another embodiment, a server is provided for performing predictive block maintenance for a frac fleet including a plurality of frac pump transports, each frac pump transport including a plurality of frac pumps, and each frac pump including a plurality of components. The server includes memory; and one or more processors operatively coupled to the memory. The memory comprises instructions that, when executed by the one or more processors, cause the one or more processors to receive, from a client device, well completion design data for completing a plurality of stages of a well completion operation with the frac fleet. The instructions further cause the one or more processors to determine predicted component life intervals for each of the plurality of components of the frac fleet. The instructions further cause the one or more processors to determine remaining component life intervals for each of the plurality of components of the frac fleet based on at least the respective predicted component life intervals. Still further, the instructions cause the one or more processors to set a continuous completion event for the well completion operation based on the remaining component life intervals for each of the plurality of components. The continuous completion event including a continuous pumping block and a maintenance block, the continuous pumping block identifying one or more contiguous stages from among the plurality of stages during which the well completion operation is performed with the frac fleet, and the maintenance block identifying one or more of the plurality of frac pumps to be subject to predetermined maintenance operations upon completion of the one or more contiguous stages of the continuous pumping block. Yet still further, the instructions cause the one or more processors to transmit the set continuous completion event for the well completion operation to the client device.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2A is a schematic diagram of an embodiment of a fracturing pump transport that is able to engage or disengage one or more pumps from a prime mover.

FIG. 2B is a schematic diagram of an embodiment of the fracturing pump transport that is able to engage or disengage one or more pumps from the prime mover.

FIG. 6 illustrates an exemplary user interface showing a well completion design for a frac fleet to perform a well completion operation.

FIG. 7 illustrates an exemplary user interface showing an updated well completion design based on the well completion design of FIG. 6.

FIG. 8 is a flowchart illustrating a method for predicting component life intervals of components of a frac pump transport, in accordance with one or more embodiments.

FIG. 9 is a flowchart illustrating a method for setting a continuous completion event for a well completion design, in accordance with one or more embodiments.

Figure 1:
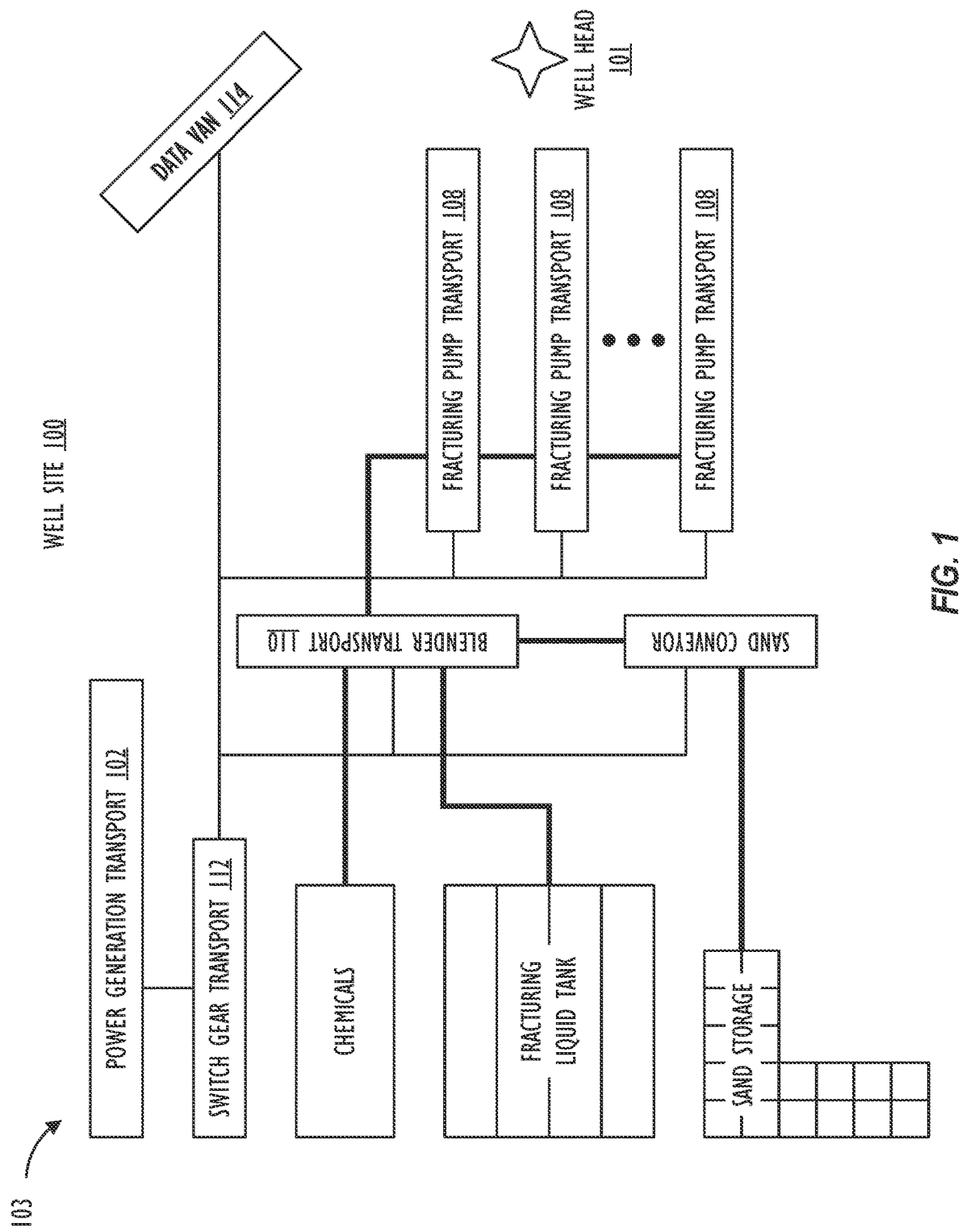
FIG. 1 is a schematic diagram of a mobile hydraulic fracturing system operating at a well site, in accordance with one or more embodiments.

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

DESCRIPTION

In the following description, for purposes of explanation, numerous specific details are set forth in order to provide a thorough understanding of the inventive concept. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" or "some embodiments" or "other embodiments" means that a particular feature, structure, or characteristic described in connection with the embodiment is included in at least one embodiment of the invention, and multiple references to "one embodiment" or "an embodiment" or "another embodiment" or "some embodiments" or "other embodiments" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "transport" refers to any transportation assembly, including, but not limited to, a trailer, truck, skid, and/or barge used to transport relatively heavy structures, such as a gas turbine, a generator, one or more fracturing pumps, a pump prime mover, and the like.

As used herein, the term "trailer" refers to a transportation assembly used to transport the relatively heavy structures that can be attached and/or detached from a transportation vehicle used to pull or move the trailer. In one embodiment, the trailer may include the mounts and manifold systems to connect the trailer to other equipment.

As used herein, the term "lay-down trailer" refers to a trailer that includes two sections with different vertical heights. One of the sections or the upper section is positioned at or above the trailer axles and another section or the lower section is positioned at or below the trailer axles. In one embodiment the main trailer beams of the lay-down trailer may be resting on the ground when in operational mode and/or when uncoupled from a transportation vehicle, such as a tractor.

This disclosure pertains to systems and methods for predicting life intervals of respective components of each of a plurality of fracturing pumps (e.g., frac pumps) or of other components (e.g., electrical or mechanical components) of each of a plurality of fracturing pump transports (e.g., frac pump transport) of a hydraulic fracturing fleet (e.g., frac fleet). Based on the predictions, the systems and methods are configured to set one or more continuous pumping blocks in association with a well completion design for a well completion operation.

In some embodiments, a pump maintenance application may be deployed to be accessible by a plurality of users associated with the frac fleet. The pump maintenance application may provide a human machine interface enabling the users to input (e.g., review, validate, set, and the like) pump maintenance data for each of a plurality of well completion operations performed by the frac fleet. The pump maintenance application may further be configured to track (e.g., based on sensor data) in real-time, component life or usage information for each component of each frac pump (e.g., track a number of pump strokes for a given component since installation of the component) as the component is used in the frac fleet for well completion operations. The pump maintenance data may include, for each of the plurality of frac pumps of each frac pump transport of the frac fleet, usage data indicating the actual component life intervals (based on the tracked component life information) of each of the plurality of components of the frac pump. In some embodiments, the actual component life intervals may be measured as a number of pump strokes, a number of pump barrels, and the like.

The frac pump components may correspond to macro-level assemblies of the frac pump, one or more sub-assemblies within the macro-level assemblies, or correspond to individual components of an assembly or sub-assembly. The frac pump components may also correspond to other electrical or mechanical components disposed on the frac pump transport. Non-limiting examples of the plurality of components of each frac pump include macro-level assemblies of the frac pump (e.g., a fluid end assembly, a power end assembly), one or more sub-assemblies within the macro-level assemblies (e.g., a main cylinder of the fluid end assembly, a stuffing box of the fluid end assembly, a crankshaft housing of the power end assembly, a crosshead section of the power end assembly, a spacer section of the power end assembly, a gearbox of the power end assembly, and the like), or individual components of an assembly or sub-assembly of the frac pump. Non-limiting examples of the individual components include a plurality of plungers, a plurality of pony rods, a plurality of pony rod clamps, a plurality of packings, a plurality of packing wiper seals, a plurality of packing rings, a plurality of packing nuts or glands, a plurality of (suction or discharge) valves, a plurality of (suction or discharge) seats, a plurality of (suction or discharge) seals, a plurality of caps, and the like. Components of the fluid end assembly of each frac pump may be referred to as consumable components that need to be replaced after a predetermined amount of use.

The well completion operations may be past well completion operations performed by the frac fleet, and the corresponding pump maintenance data may include operating condition data (e.g., sand type, fluid type) indicating one or more operating conditions when the well completion operation was performed. The pump maintenance data may thus indicate for each well completion operation, the number of times a given component (e.g., assembly, sub-assembly, individual component) of a given pump or a given pump transport of the frac fleet has been replaced, the actual life interval (e.g., measured as a number of pump strokes) of the given component each time from installation to replacement, whether the replacement was during a scheduled maintenance event or during an unscheduled maintenance event (e.g. a failure event), the operating conditions associated with the given component during its life interval, and the like.

Techniques disclosed herein further look to analyze the pump maintenance data of the plural well completion operations gathered in the pump maintenance application, and develop a maintenance prediction model for the fracturing fleet based on the analysis. In some embodiments, the maintenance prediction model may be a statistical model developed using normalization or regression techniques. In some embodiments, the maintenance prediction model may be a machine-learned model trained to perform predictions based on the pump maintenance data. The maintenance prediction model can then be deployed for the fracturing fleet, and be configured to receive as input, an operating condition of a current well completion operation being performed by the frac fleet. The maintenance prediction model may then output for the current well completion operation, and for each of the plurality of components of each frac pump or each frac pump transport of the frac fleet, predictions indicating expected component life intervals for the components. In some embodiments, a user interface may present the predicted component life intervals for each frac pump alongside or in conjunction with the corresponding tracked current component life or usage information, and component-level and pump-level identification information. The operator of the frac fleet may thus have a "birds-eye" view of the overall health and maintenance status of the entire fracturing fleet down to the individual component-level. The operator may thus be able to easily identify upcoming maintenance events based on the remaining life of the components (e.g., remaining component life intervals as determined based on the predicted component life intervals and the corresponding tracked current component life or usage information; remaining component life intervals as gleaned from a "circular progress bar" displayed on the user interface in association with each component), and schedule maintenance events for the components or the corresponding frac pumps or frac pump transports of the frac fleet more efficiently. In determining the predicted component life intervals, since the underlying analytical data (e.g., pump maintenance data) is specific to the same frac fleet for which the predicted component life intervals are being determined, and since the analytical data takes the past operating conditions for the past well completion operations into account, geographic region-specific factors where the frac fleet primarily operates are taken into considersion, thereby generating more accurate predictions for component life intervals, the predictions being further refined as a function of an input operating condition (e.g., dirty fluid type, clean fluid type) for the well completion operation.

In some embodiments, the system and method may further be configured to utilize the predicted component life intervals, the tracked current component life or usage information, and the corresponding remaining component life interval of the respective components, to develop a predictive block maintenance model, based on a well completion design for the well completion operation. The well completion design may include information regarding hydraulically fracking a number of wells at a well pad, a number of fracking stages for each well, an operating condition (e.g., fluid type, sand type, fluid pressure) for fracking each stage of each well, a number of barrels to be pumped for fracking each stage of each well, the amount of time permitted for fracking each stage, and the like. That is, based on the well completion design, and further based on the predicted component life intervals for each component of each frac pump or each frac pump transport of the hydraulic fracturing fleet, the system and method may be configured to generate and set one or more continuous completion events for the well completion design of the well completion operation automatically and efficiently. The continuous completion event may include a continuous pumping block and a maintenance block. The continuous pumping block may identify one or more contiguous stages from among the plurality of stages of the well completion design during which the well completion operation may be continuously performed without the need for maintenance on the components of the frac pumps. The maintenance block may identify components of one or more frac pumps or of one or more of the plurality of frac pump transports that are to be subject to predetermined maintenance operations (e.g., replace identified components, service the identified components) upon completion of the corresponding continuous pumping block including one or more contiguous stages.

The system and method thus enable scheduling of one or more maintenance blocks for a given well completion design with high precision and in advance, based on the predicted component life intervals, so as to maximize a duration of the continuous pumping blocks and minimize downtime during which the maintenance is being performed. By intelligently scheduling the one or more continuous completion events based on the well completion design and the predicted component life intervals, the system and method enable multiple maintenance events to be performed simultaneously for multiple components of multiple frac pumps or multiple frac pump transports of the frac fleet, thereby reducing the NPT while ensuring predetermined threshold pumping horsepower output levels for the frac fleet are maintained, and overall health of the frac fleet is maintained and unnecessary damage to equipment (e.g., due to operation with components that need to be serviced or replaced) is prevented.

FIG. 1 is a schematic diagram of a mobile hydraulic fracturing system 103 operating at a well site 100, in accordance with one or more embodiments. The well site 100 comprises a wellhead 101 (e.g., frac pad including multiple wells) and the mobile fracturing system 103 (e.g., hydraulic fracturing fleet, frac fleet or system). Generally, the mobile fracturing system 103 may perform fracturing operations to complete a well and/or transform a drilled well into a production well. For example, the well site 100 may be a site where operators are in the process of drilling and completing a well. Operators may start the well completion process (e.g., well completion operation) after drilling, running production casing, and cementing within the wellbore. The operators may also insert a variety of downhole tools into the wellbore and/or as part of a tool string used to drill the wellbore. After the operators drill the well to a certain depth, a horizontal portion of the well may also be drilled and subsequently encased in cement. The operators may subsequently remove the rig, and the mobile fracturing system 103 may be moved onto the well site 100 to perform the well completion operation (e.g., fracturing operation) that force relatively high-pressure fracturing fluid through the wellhead 101 into subsurface geological formations to create fissures and cracks within the rock. The mobile fracturing system 103 may be moved off the well site 100 once the operators complete the well completion operation. Typically, the well completion operation for the well site 100 may last several days.

In some embodiments, the mobile fracturing system 103 may comprise a power generation transport 102 (e.g., mobile source of electricity) configured to generate electricity by converting hydrocarbon fuel, such as natural gas, obtained from one or more sources (e.g., a producing wellhead) at the well site 100, from a remote offsite location, and/or another relatively convenient location near the power generation transport 102. That is, the mobile fracturing system 103 may utilize the power generation transport 102 as a power source that burns cleaner while being transportable along with other fracturing equipment. The generated electricity from the power generation transport 102 may be supplied to fracturing equipment to power fracturing operations at one or more well sites, or to other equipment in various types of applications requiring mobile electric power generation.

As shown in FIG. 1, the power generation transport 102 may be implemented as a single power generation transport. In other embodiments, the power generation transport 102 may be implemented using two or more transports, and components of the power generation transport 102 may be arranged on the two or more transports in any reasonable manner. For example, the power generation transport 102 may be implemented using a two-transport design in which a first transport may comprise a turbine (e.g., gas turbine) and a generator, and a second transport may comprise an air filter box providing filtered combustion air for the turbine, and an exhaust stack that securely provides an exhaust system for exhaust air from the turbine. As another example, the power generation transport 102 may be implemented using a three-transport design in which a first transport may include a gas turbine, a second transport may include a generator, and a third transport may include an air handling system that provides filtered intake air for combustion by the turbine.

Although not shown in FIG. 1, the power generation transport 102 may include a variety of equipment for mobile electric power generation including a gas conditioning skid, a black start generator, a power source (e.g., gas turbine), a power source air inlet filter housing, a power source inlet plenum, a power source exhaust collector, an exhaust coupling member, a power source exhaust stack, a gearbox, a generator shaft, a generator, a generator air inlet filter housing, a generator ventilation outlet, a generator breaker, a transformer, a starter motor, and a control system. Other components on the power generation transport 102 may include a turbine lube oil system, a fire suppression system, a generator lube oil system, and the like.

In one embodiment, the power source may be a gas turbine. In another embodiment, power source may be another type of power source (e.g., diesel engine). The gas turbine may generate mechanical energy (e.g., rotation of a shaft) from a hydrocarbon fuel source, such as natural gas, liquefied natural gas, condensate, and/or other liquid fuels. For example, a shaft of the gas turbine may be connected to the gearbox and the generator such that the generator converts the supplied mechanical energy from the rotation of the shaft of the gas turbine to produce electric power. The gas turbine may be a commercially available gas turbine such as a General Electric NovaLT5 gas turbine, a Pratt and Whitney gas turbine, or any other similar gas turbine. The generator may be a commercially available generator such as a Brush generator, a WEG generator, or other similar generator configured to generate a compatible amount of electric power. For example, the combination of the gas turbine, the gearbox, and the generator within power generation transport 102 may generate electric power from a range of at least about 1 megawatt (MW) to about 60 MW (e.g., 5.6 MW, 32 MW, or 48 MW). Other types of gas turbine/generator combinations with power ranges greater than about 60 MW or less than about 1 MW may also be used depending on the application requirement.

In addition to the power generation transport 102, the mobile fracturing system 103 may include a switch gear transport 112, at least one blender transport 110, at least one data van 114, and one or more fracturing pump transports 108 that deliver fracturing fluid through the wellhead 101 to the subsurface geological formations. The switch gear transport 112 may receive electricity generated by the power generation transport 102 via one or more electrical connections. In one embodiment, the switch gear transport 112 may use 13.8 kilovolts (KV) electrical connections to receive power from the power generation transport 102. The switch gear transport 112 may transfer the electricity received from the power generation transport 102 to electrically connected fracturing equipment of the mobile fracturing system 103. The switch gear transport 112 may comprise a plurality of electrical disconnect switches, fuses, transformers, and/or circuit protectors to protect the fracturing equipment. In some embodiments, switch gear transport 112 may be configured to step down a voltage received from the power generation transport 102 to one or more lower voltages to power the fracturing equipment.

Each fracturing pump transport 108 may receive the electric power from the switch gear transport 112 to power a prime mover. The prime mover converts electric power to mechanical power for driving one or more fracturing pumps of the fracturing pump transport 108. In one embodiment, the prime mover may be a dual shaft electric motor that drives two different frac pumps mounted to each fracturing pump transport 108. Each fracturing pump transport 108 may be arranged such that one frac pump is coupled to opposite ends of the dual shaft electric motor and avoids coupling the pumps in series. By avoiding coupling the pump in series, fracturing pump transport 108 may continue to operate when either one of the pumps fails or has been removed from the fracturing pump transport 108. Additionally, repairs to the pumps may be performed without disconnecting the system manifolds that connect the fracturing pump transport 108 to other fracturing equipment within the mobile fracturing system 103 and the wellhead 101. The fracturing pump transport 108 may implement (in whole or in part) a system for predicting frac pump component life intervals and setting a continuous completion event for a well completion design. Configuration of the fracturing pump transport 108 is described in further detail in connection with FIGS. 2A-2B below.

The blender transport 110 may receive electric power fed through the switch gear transport 112 to power a plurality of electric blenders. A plurality of prime movers may drive one or more pumps that pump source fluid and blender additives (e.g., sand) into a blending tub, mix the source fluid and blender additives together to form fracturing fluid, and discharge the fracturing fluid to the fracturing pump transports 108. In one embodiment, the electric blender may be a dual configuration blender that comprises electric motors for the rotating machinery that are located on a single transport. In another embodiment, a plurality of enclosed mixer hoppers may be used to supply the proppants and additives into a plurality of blending tubs.

The data van 114 may be part of a control network system, where the data van 114 acts as a control center configured to monitor and provide operating instructions to remotely operate the blender transport 110, the power generation transport 102, the fracturing pump transports 108, and/or other fracturing equipment within the mobile fracturing system 103. For example, the data van 114 may implement (in whole or in part) the system for predicting frac pump component life intervals and setting a continuous completion event for a well completion operation. In one embodiment, the data van 114 may communicate with the variety of fracturing equipment using a control network system that has a ring topology (or star topology). A ring topology may reduce the amount of control cabling used for fracturing operations and increase the capacity and speed of data transfers and communication.

Other fracturing equipment shown in FIG. 1, such as fracturing liquid (e.g., water) tanks, chemical storage of chemical additives, hydration unit, sand conveyor, and sandbox storage are known by persons of ordinary skill in the art, and therefore are not discussed in further detail. In one or more embodiments of the mobile fracturing system 103, one or more of the other fracturing equipment shown in FIG. 1 may be configured to receive power generated from the power generation transport 102. The control network system for the mobile fracturing system 103 may remotely synchronize and/or slave the electric blender of the blender transport 110 with the electric motors of the fracturing pump transports 108.

FIGS. 2A and 2B are schematic diagrams of an embodiment of the fracturing pump transport 108 that is able to engage or disengage one or more frac pumps from a prime mover. As shown in FIGS. 2A and 2B, the fracturing pump transport 108 may include prime mover 204 powering two separate pumps 202A and 202B (e.g., frac pumps, fracturing pumps). By combining a single prime mover 204 attached to two separate pumps 202A and 202B on a transport, a fracturing operation may reduce the amount of pump transports, prime movers, variable frequency drives (VFD's), ground iron, suction hoses, and/or manifold transports. Although FIGS. 2A and 2B illustrate that the fracturing pump transport 108 supports a single prime mover 204 powering two separate pumps 202A and 202B, other embodiments of the fracturing pump transport 108 may include a plurality of prime movers 204 that power respective one of pumps 202A and 202B. The number of prime movers and the number of frac pumps on each fracturing pump transport 108 is not intended to be limiting. Other embodiments of the fracturing pump transport 108 may have a different number of prime movers and/or pumps than that shown in FIGS. 2A-2B.

The fracturing pump transport 108 may include a trailer 210 having a "lay-down" design. Such a design may provide mobility, improved safety, and enhanced ergonomics for crew members to perform routine maintenance and operations of the pumps 202A-202B since the "lay-down" arrangement positions the pumps 202A and 202B lower to the ground as the main trailer beams are resting on the ground for operational mode. As shown in FIGS. 2A and 2B, lay-down trailer 210 has an upper section above the trailer axles that could hold or have mounted a fracturing pump trailer power and control system 208. The fracturing pump trailer power and control system 208 may comprise one or more electric drives, transformers, controls (e.g., a programmable logic controller (PLC) located on the fracturing pump transport 108), and cables for connection to the drive power trailers and/or a separate electric pumper system. The electric drives may provide control, monitoring, and reliability functionality, such as preventing damage to a grounded or shorted prime mover 204 and/or preventing overheating of components (e.g., semiconductor chips) within the electric drives. The lower section of the lay-down trailer 210, which may be positioned lower than the trailer axles, may hold or have mounted the prime mover 204 and the pumps 202A and 202B attached on opposite sides of the prime mover 204.

In one embodiment, the prime mover 204 may be a dual shaft electric motor that has a shaft that protrudes on opposite sides of the electric motor. The dual shaft electric motor may be any desired type of alternating current (AC) or direct current (DC) motor. In one embodiment, the dual shaft electric motor may be an induction motor. In another embodiment the dual shaft electric motor may be a permanent magnet motor. Other embodiments of the prime mover 204 may include other electric motors that are configured to provide about 5,000 HP or more. For example, the dual shaft electric motor may deliver motor power in a range from about 1,500 HP to about 10,000 HP. Specific to some embodiments, the dual shaft electric motor may be about a 5,000 HP rated electric motor or about a 10,000 HP electric motor. The prime mover 204 may be driven by at least one variable frequency drive that is rated to a maximum of about 5,000 HP and may receive electric power generated from the power generation transport 102.

As shown in FIGS. 2A and 2B, one side of the prime mover 204 drives one pump 202A and the opposite side of the prime mover 204 drives a second pump 202B. In some embodiments, the pumps 202A and 202B are not configured in a series configuration in relation to the prime mover 204. In other words, the prime mover 204 may independently drive each pump 202A and 202B such that if one pump fails, it can be disconnected, and the other pump can continue to operate. The prime mover 204, which could be a dual shaft electric motor, may prevent dissonance or feedback when transferring power to the pumps 202A and 202B. In one embodiment, the prime mover 204 may be configured to deliver at least about 5,000 HP distributed between the two pumps 202A and 202B. For instance, the prime mover 204, which may be a dual shaft electric motor, may provide about 2,500 HP to one of the pumps 202A and about 2,500 HP to the other pump 202B in order to deliver a total of about 5,000 HP. Other embodiments may have the prime mover 204 deliver less than 5,000 HP or more than 5,000 HP. For example, the prime mover 204 may deliver a total of about 3,000 HP by delivering about 1,500 HP to one of the pumps and about 1,500 HP to the other pump. Another example may have the prime mover 204 deliver a total of about 10,000 HP by delivering about 5,000 HP to one of the pumps 202A and about 5,000 HP to the other pump 202B. Non-limiting examples of HP ratings of the prime mover 204 may include 3,000 HP, 3,500 HP, 4,000 HP, 4,500 HP, 5,000 HP, 5,200 HP, 5,400 HP, 6,000 HP, 7,000 HP, 8,000 HP, 9,000 HP, and/or 10,000 HP.

In some embodiments, each of the pumps 202A and 202B of the frac pump transport 108 may be quintuplex pumps. Other embodiments may include other types of plunger style pumps, such as triplex pumps. The pumps 202A and 202B may each operate from a range of about 1,500 HP to about 5,000 HP. Non-limiting examples of HP ratings of each of the pumps 202A and 202B may include 1,500 HP, 1,750 HP, 2,000 HP, 2,250 HP, 2,500 HP, 2,600 HP, 2,700 HP, 3,000 HP, 3,500 HP, 4,000 HP, 4,500 HP, and/or 5,000 HP. The pumps 202A and 202B may be configured in a series configuration where the prime mover 204 drives the pump 202A and the pump 202A subsequently drives the pump 202B. Alternately, the pumps 202A and 202B may be independently operated by the prime mover 204.

The prime mover 204 and each of the pumps 202A and 202B may be mounted on sub-assemblies configured to be isolated and allow for individual removal from the fracturing pump transport 108. In other words, the prime mover 204 and each of the pumps 202A and 202B can be removed for service and replaced without shutting down or compromising other portions of the fracturing pump transport 108. That is, the prime mover 204 and the pumps 202A and 202B may be connected to each other via couplings that are disconnected when removed from the fracturing pump transport 108. If the prime mover 204 needs to be replaced or removed for repair, the prime mover 204 sub-assembly may be detached from the fracturing pump transport 108 without removing the two pumps 202A and 202B from the fracturing pump transport 108. Similarly, the pump 202A can be isolated from the fracturing pump transport 108, removed, and replaced by a new pump 202A. If the prime mover 204 and/or the pumps 202A and 202B require service, an operator can isolate the different components from the fluid lines, and unplug, un-pin, and remove the prime mover 204 and/or the pumps 202A and 202B from the fracturing pump transport 108. Furthermore, each pump 202A/202B sub-assembly may be detached and removed from the fracturing pump transport 108 without removal of the other pump 202A/202B and/or the prime mover 204.

To implement independent removal of the sub-assemblies, the two pumps 202A and 202B may be coupled to the prime mover 204 using respective drive line assemblies 206, each of which is adapted to provide local or remote operation to engage or dis-engage respective one of the pumps 202A and 202B from the prime mover 204. Each drive line assembly 206 may comprise one or more couplings and a drive shaft. For example, the drive line assembly 206 may comprise a fixed coupling that connects to one of the pumps 202A or 202B and a corresponding keyed shaft 212. The keyed shaft 212 may interconnect the fixed coupling to a corresponding splined toothed coupling 214 that is attached to the prime mover 204. To engage or disengage one or both pumps 202A and 202B from the prime mover 204, each spline toothed coupling 214 may include a splined sliding sleeve motor and pump coupling that provides motor shaft alignment and provides for a hydraulic fluid powered for connection and disconnection of the sliding sleeve motor and pump coupling. Other embodiments of the couplings may include torque tubes, air clutches, electro-magnetic clutches, hydraulic clutches, and/or other clutches and disconnects that have manual and/or remote operated disconnect devices.

FIGS. 2A-2B further illustrate that the fracturing pump transport 108 includes an engagement panel 220 for adjusting each spline toothed coupling 214 to engage and disengage the pumps 202A and 202B from the prime mover 204. As an example, the engagement panel 220 includes levers or switches that an operator manually operates to engage or disengage one or both of the pumps 202A and 202B from the prime mover 204. Additionally, or alternatively, to engage or disengage one or both of the pumps 202A and 202B from the prime mover 204, the engagement panel 220 may include electronic controllers that receive instructions from remote locations, such as a monitoring station that is part of the power and control system 208, another location at the well site (e.g., data van 114), and/or off-site via a network (e.g., the Internet). For example, if both the pumps 202A and 202B are initially in an engaged position, in response to receiving a remote command, the engagement panel 220 may trigger disengagement of the pump 202B (so as to stop fluid pumping operation of the pump 202B) while the other pump 202A remains in the engaged position (so as to allow the pump 202A to pump high-pressure fluid into the wellhead 101).

FIGS. 2A-2B further illustrate that each of the pumps 202A and 202B includes a fluid end assembly 216 and a power end assembly 218 that couples to the corresponding fluid end assembly 216. Each power end assembly 218 generates torque to drive the corresponding fluid end assembly 216 (e.g., plungers) of each of the pumps 202A and 202B. The power end assembly 218 may include a gear box including pinion gears and/or bull gears that rotate based on torque input from the drive shaft of the drive line assembly 206 driven by the prime mover 204. Rotating the pinion gears causes the bull gears to rotate, which in turn causes rotation of a crankshaft within the power end assembly 218 of the pumps 202A and 202B. Rotation of the crankshaft then produces torque that moves plungers in the fluid end assembly 216 of the pumps 202A and 202B to pump and pressurize fracturing fluid into the wellhead 101. The plurality of components of the frac pump transport 108 may refer to macro-level assemblies, any of the sub-assemblies within the macro-level assemblies, or any individual component of an assembly or sub-assembly of the frac pump transport 108. The pumps 202A and 202B are illustrated in greater detail in FIGS. 3A and 3B.

Figure 3A:
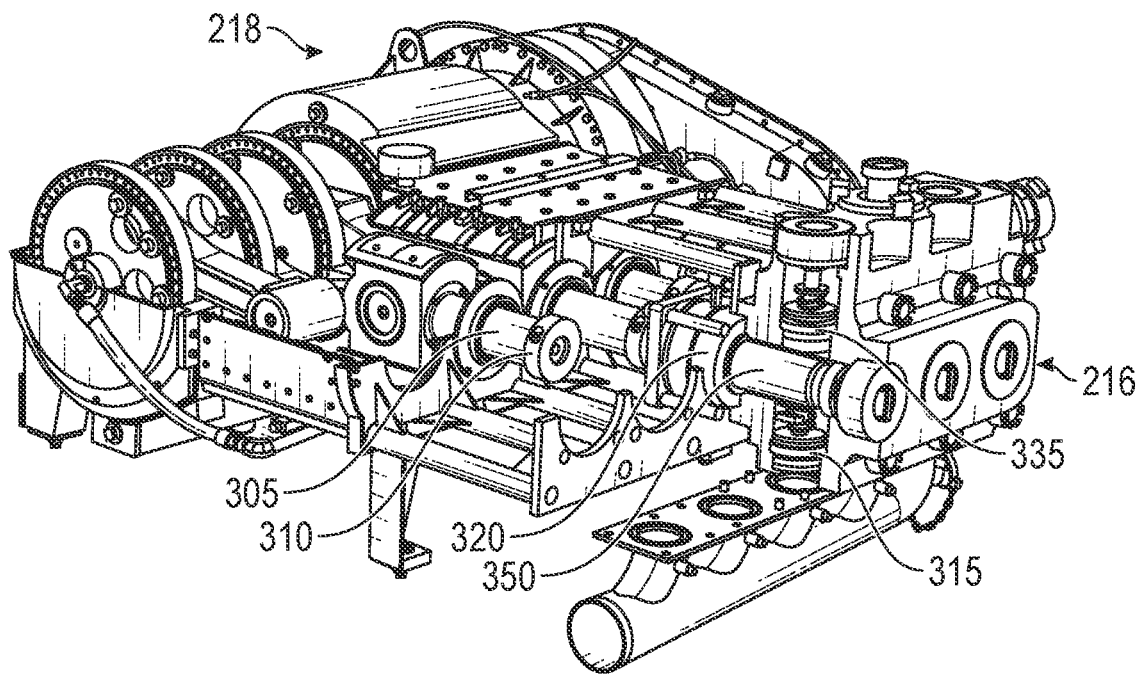
FIG. 3A illustrates an exposed view of a pump provided on a fracturing pump transport, in accordance with one or more embodiments.
Figure 3B:
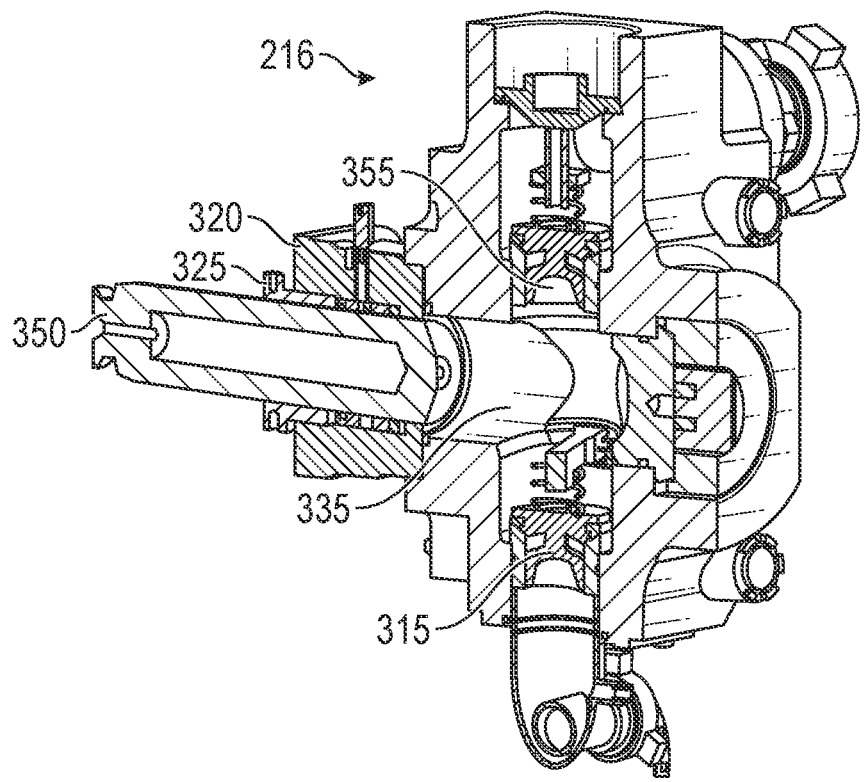
FIG. 3B illustrates a cross-section view of a fluid end assembly of the pump of FIG. 3A, in accordance with one or more embodiments.

In particular, FIG. 3A illustrates an exposed view of a pump 202 (e.g., pump 202A or 202B) provided on the fracturing pump transport 108, in accordance with one or more embodiments. FIG. 3B illustrates a cross-section view of the fluid end assembly 216 of the pump 202 provided on the fracturing pump transport 108, in accordance with one or more embodiments. As shown in FIGS. 3A-3B, the pump 202 may be a reciprocating, positive displacement, horizontal single-acting pump in which rotational motion from the prime mover 204 at a given horsepower is applied to an input shaft flange. The power end assembly 218 of the pump 202 may convert received rotational motion into linear reciprocating motion of plungers 350 of the fluid end assembly 216. In turn, the plungers 350 may reciprocate in the fluid end assembly 216 displacing a fixed volume of fluid with a suction stroke for incoming fluid from a suction end 315, and a power stroke for discharge fluid from a discharge end 355. Fluid may thus be compressed to discharge pressure and pushed through the discharge end 355.

The power end assembly 218 may include multiple sub-assemblies including a crankshaft housing, a crosshead section, a spacer section, and a gearbox. As shown in FIGS. 3A-3B, the pump 202 may, for example, be a quintuplex pump in which five pony rods 305 of the crosshead section of the power end assembly 218 are respectively coupled to the five plungers 350 of the fluid end assembly 216 via respective five pony rod clamps 310. The pony rods 305 may be actuated by the crankshaft sub-assembly of the power end assembly 218 to generate linear reciprocating motion, and in turn, linearly reciprocate the respective plungers 350 in and out of the fluid end assembly 216 on the suction and discharge strokes to pump high-pressure fluid (e.g., mixture of sand and water for hydraulic fracturing) into the wellhead 101.

Each plunger 350 may be configured to move in and out of a main cylinder of the fluid end assembly 216 via a corresponding plunger bore 335. The plunger 350 may be made of a lower carbon steel and may have a wear finish deposited and polished thereon to a smooth surface for proper sealing. Each plunger bore 335 may receive the corresponding plunger 350, which is reciprocated in the plunger bore 335 to pump fluid through the respective discharge ends 355. The plunger end of each plunger bore 335 is sealed by a packing in a stuffing box 320. The packing in the stuffing box 320 for each plunger 350/plunger bore 335 combination may include multiple components including a series of packing elements (e.g., packing rings 330). A packing nut or gland 325 may be provided around an outer periphery of the plunger 350 to compress the packing and to provide a high-pressure seal. A packing wiper seal received in a peripheral groove in the packing nut 325 may seal the stuffing box 320. Lubrication ports may also be provided that permit a lubricant to be pumped into the stuffing box 320 to provide lubrication between the plunger 350 and the plunger bore 335, between the plunger 350 and the packing nut 325, and between the plunger 350 and the stuffing box 320. Although not shown in FIGS. 3A-3B, the fluid end assembly 216 may further include a plurality of sensors that are configured to measure a number of strokes (e.g., suction strokes, power (discharge) strokes) and/or a corresponding number of barrels of fluid pumped (e.g., based on measured rotations per minute of a shaft) by each of the five plungers of each pump 202.

In the embodiment of the frac pump 202 as shown in FIGS. 3A-3B, the plurality of components of the frac pump 202 may refer to the macro-level assemblies of the frac pump (e.g., the fluid end assembly 216, the power end assembly 218), any of the sub-assemblies within the macro-level assemblies (e.g., the main cylinder of the fluid end assembly 216, the stuffing box 320 of the fluid end assembly 216, the packing of the stuffing box 320, the crankshaft housing of the power end assembly 218, the crosshead section of the power end assembly 218, the spacer section of the power end assembly 218, the gearbox of the power end assembly 218, and the like), or any individual component of an assembly or sub-assembly of the frac pump 202. Thus, for example, the plurality of components of the frac pump 202 may refer to any of the electrical or mechanical components of the frac pump 202 including but not limited to the fluid end assembly 216, the power end assembly 218, the crankshaft housing, the crosshead section, the spacer section, the gearbox, the main cylinder of the fluid end assembly 216, the plurality of stuffing boxes 320, the plurality of packings, the plurality of pony rods 305, the plurality of pony rod clamps 310, the plurality of plungers 350, the plurality of packing nuts or glands 325, the plurality of packing rings 330, and the like. In addition, although not specifically labeled in FIGS. 3A-3B, the plurality of components of a frac pump may also refer to any of a plurality of packing wiper seals, a plurality of packing rings, a plurality of packing nuts or glands, a plurality of (suction or discharge) valves, a plurality of (suction or discharge) seats, a plurality of (suction or discharge) seals, a plurality of caps, and the like.

At least a subset of the plurality of components of the frac pump 202 (e.g., components of the fluid end assembly 216) may be consumable components that need to be replaced after a predetermined amount of use. Conventional frac fleet maintenance schedules dictate replacing the frac pump consumable components by replacing entire assemblies or sub-assemblies based on predetermined "ad-hoc" schedules (e.g., replace the entire fluid end assembly 216 and all components thereof after a predetermined number of hours of operation) regardless of whether every component within the assembly or sub-assembly needs to be replaced. This leads to wasteful use of resources, and increased costs. Further, in replacing entire assemblies or sub-assemblies based on predetermined "ad-hoc" schedules, since the conventional frac fleet maintenance schedules do not account for the operating conditions (e.g., sand type, fluid type, fluid pumping pressure, fluid pumping rate, and the like) of the well completion operation, the frac fleet may encounter unscheduled maintenance events (e.g., failure event) where components of the frac pumps fail prior to maintenance, and as a result, the components have to be replaced prematurely, outside of scheduled maintenance events, causing unscheduled downtimes.

Further, conventionally, a well completion operation may be performed by a frac fleet at a well site having a well pad that may include a plurality of wells. To perform the well completion operation, operators of the frac fleet may follow a well completion design (see FIG. 5) that includes information regarding hydraulically fracking the plurality of wells at the well pad. For example, the information may include a number of fracking stages for each well, an operating condition (e.g., fluid type, sand type, fluid pressure) for fracking each stage of each well, a number of barrels to be pumped for fracking each stage of each well, the amount of time permitted for fracking each stage, pumping rate, pumping pressure, and the like. The operator may then follow the well completion design for each stage for each well to complete the well completion operation utilizing the frac fleet. During such conventional well completion operation, the operator may hydraulically frac each stage based on the instructions in the well completion design for the stage (e.g., hydraulically frac one stage of one well for a predetermined amount of time (e.g., 1.5 hours)). During the fracturing operation for the stage, the operators may manually determine (e.g., based on visual inspection) which frac pumps from among the plurality of frac pumps of the plurality of frac pump transports are malfunctioning and may need to be serviced. After completion of the fracturing operation of the stage, the operator may stop the fracturing operation of the frac fleet, perform the required maintenance for each identified frac pump from among the plurality of frac pumps of the plurality of frac pump transports, and then restart the well completion operation to hydraulically frac the next stage based on the well completion design. The operator may thus frac each stage based on the well completion design, stop the fracking to perform a well swap operation and perform maintenance (if required), frac the next stage, and so on, until the completion of the fracking operation for each stage of the well completion operation per the well completion design.

Such a conventional approach leads to numerous problems. First, maintenance may be performed on the components of the frac pump transports of the frac fleet after every stage, which may lead to downtime or NPT after every stage. Second, since the maintenance is performed on components on a failure basis (rather than a prescheduled, preventative basis), overall health of the frac fleet may deteriorate due to operation of the fleet with sub-par or failed components. Third, since the maintenance is performed based on identification of components that need maintenance after every stage, the maintenance operations are distributed or scattered and performed separately in time, instead of scheduling maintenance, such that multiple components on multiple transports may be serviced at the same time. For example, during completion of a first stage, an operator may identify a frac pump on a first frac pump transport that needs maintenance. After completion of the first stage, the operator may stop the well completion operation, perform the required maintenance on the identified frac pump on the first frac pump transport, and then begin completion of a second stage. During completion of the second stage, the operator may now identify a frac pump on a second frac pump transport that needs maintenance, thereby causing the operator to, after completion of the second stage, perform the required maintenance on the identified frac pump on the second frac pump transport. It may very well base the case that instead of performing maintenance on the frac pumps of the first and second frac pump transports separately, the maintenance crew of the frac fleet could have performed the required maintenance for both the frac pumps of the first and second frac pump transports at the same time, after, e.g., completion of the first stage, thereby reducing downtime or NPT. It is desirable to preschedule maintenance blocks where multiple maintenance events for different components of different frac pumps of different frac pump transports can be performed simultaneously to increase efficiency, increase continuous fracturing operation times, and reduce downtimes.

To overcome the above problems, the present disclosure proposes systems and methods for predicting life intervals of respective components of each of the plurality of fracturing pumps or each of the plurality of fracturing pump transports of the hydraulic fracturing fleet, and performing maintenance on the electrical or mechanical components of the frac pump transports based on the predictions, so as to perform the maintenance on a prescheduled, preventative basis rather than on a failure basis, while also avoiding wasteful use of resources, avoiding replacement of components unnecessarily, or outside of scheduled maintenance events. The systems and methods of the present disclosure are further configured to identify and set one or more continuous pumping blocks and corresponding maintenance blocks based on the well completion design and further based on the predicted component life intervals of each component of each frac pump, so as to avoid having to perform maintenance after every stage of the well completion design, and so as to perform multiple maintenance events for different components of different frac pumps or different frac pump transports simultaneously, thereby increasing efficiency, increasing continuous fracturing operation times, and reducing downtimes. The systems and methods according to the present disclosure are described further below in connection with FIGS. 4-9.

Figure 4:
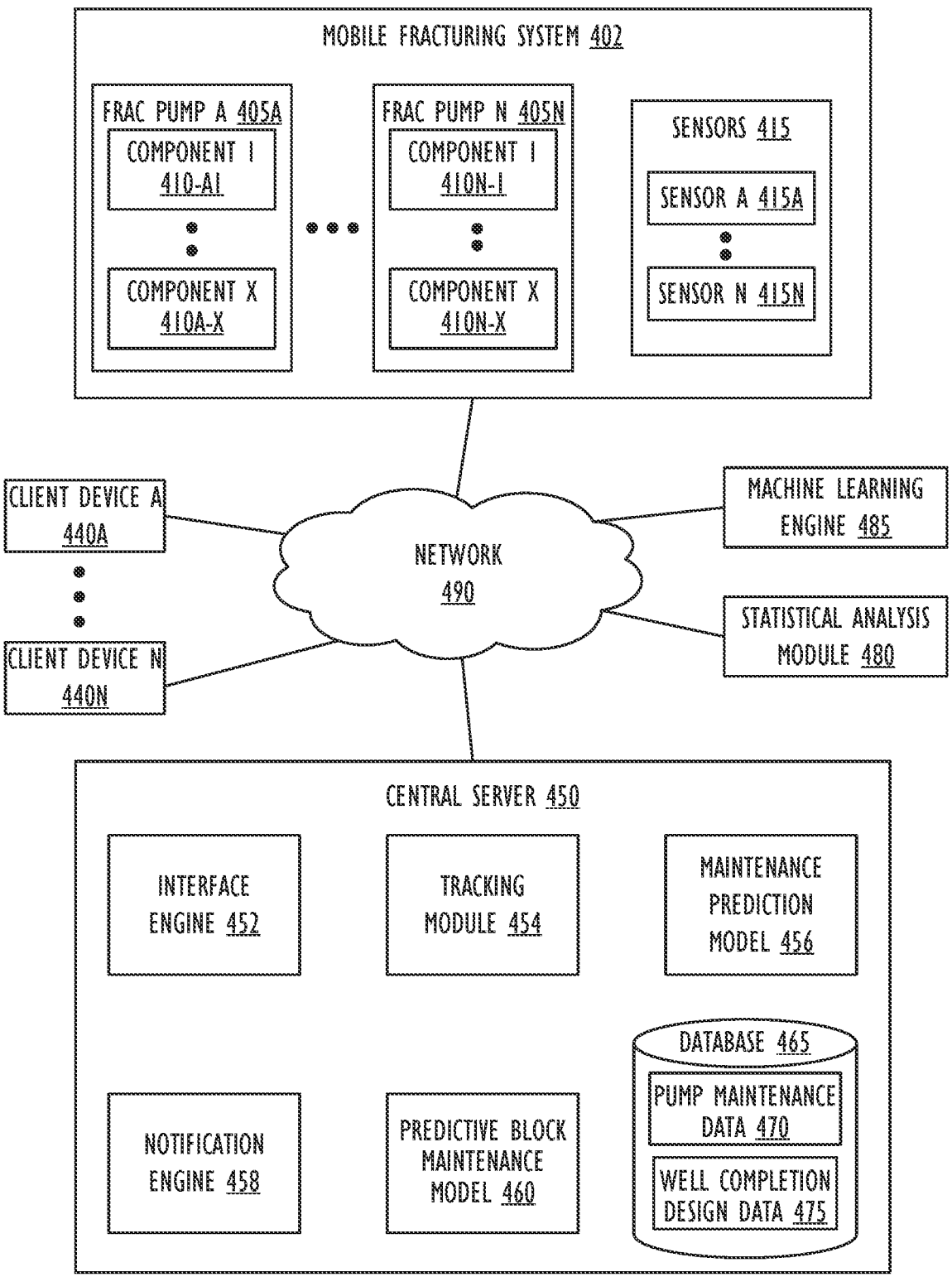
FIG. 4 is a block diagram of a frac fleet environment, in accordance with one or more embodiments.

FIG. 4 is a block diagram of a frac fleet environment 400, in accordance with one or more embodiments. The environment 400 of FIG. 4 includes a mobile fracturing system 402 (e.g., hydraulic frac fleet), a plurality of client devices 440 (e.g., 440A, . . . , 440N), a central server 450, and a statistical analysis module 480, and a machine learning engine 485, each communicatively coupled via a network 490. It should be noted that in other embodiments, the environment 400 may include different, fewer, or additional components than those illustrated in FIG. 4. In some embodiments, some or all of the functionality of the central server 450 may be subsumed by the mobile fracturing system 402 (e.g., by a data van as shown in FIG. 1). As another example, the machine learning engine 480 and/or the statistical analysis module may be implemented by the central server 130 and/or by the mobile fracturing system 402. Likewise, the client devices 440 and the central server 450 can be the same device.

The mobile fracturing system 402 of FIG. 4 may be similar to the mobile fracturing system 103 of FIG. 1, and detailed description thereof is omitted here. The mobile fracturing system 402 may include a plurality of frac pumps 405 (e.g., frac pump A 405A, . . . , frac pump N 405N), and a plurality of sensors 415 (e.g., sensor A 415A, . . . , sensor N 415N). Each frac pump 405 may include a plurality of components 410 (e.g., component 1 410A-1, . . . , component X 410A-X, . . . , component 1 410N-1, . . . , component X 410N-X). The frac pumps 405 and the plurality of components 410 of each frac pump 405 have been previously described in detail in connection with FIGS. 1, 2A, 2B, 3A, and 3B, and detailed description thereof is omitted here. As noted previously, the plurality of frac pumps 405 may be mounted to a plurality of frac pump transports (e.g., frac pump transports 108 in FIGS. 1 and 2) of the mobile fracturing system 402. In some embodiments, each of the plurality of frac pump transports of the mobile fracturing system 402 may include two of the plurality of frac pumps 405. Components 410 may also include electrical or mechanical components of the frac pump transports other than the components of the frac pumps 405.

The plurality of sensors 415 may be respectively associated with (e.g., coupled to, attached to, disposed with, correspond to) the plurality of components 410 of the mobile fracturing system 402. The sensors 415 may be configured such that during a well completion operation, the sensors 415 are operational to generate sensor data. The sensor data may correspond to, for each component 410, a real-time measurement of a predetermined metric associated with the component. The predetermined metric may indicate a component life or usage information of the component. For example, for each component 410 of the fluid end assembly of the frac pump 405, the corresponding sensors 415 may count a number of strokes pumped by the component during a well completion operation. As another example, the corresponding sensors 415 may count a number of barrels of fluid pumped by the component during the well completion operation.

Sensors 415 may include one or more of a plurality of types of sensors including acoustic or sound sensors; optical, light, or imaging sensors; flow or fluid velocity sensors; position, angle, displacement, distance, speed, or acceleration sensors; and the like. For example, sensors 415 may include an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor sensor, an electrostatic sensor, a temperature sensor, a heat sensor, a thermometer, a light sensor, a differential light sensor, an opacity sensor, a scattering light sensor, a diffraction sensor, a refraction sensor, a reflection sensor, a polarization sensor, a phase sensor, a florescence sensor, a phosphorescence sensor, a pixel array, a micro pixel array, a rotation sensor, a velocity sensor, an inclinometer, a pyranometer, a momentum sensor, a pump pressure sensor, a wave radar probe, a piezoelectric sensor, an oscilloscope, and the like.

The client devices 440 are computing devices, such as a computer, a laptop, a mobile phone, a tablet computer, or any other suitable device configured to receive information from or provide information to the central server 450. Although in the embodiment of FIG. 4, the client devices 440 are configured to communicate with the central server 450, in other embodiments, the client devices 440 may be configured to communicate directly with the mobile fracturing system 402. The client devices 440 can include input mechanisms (such as a keypad, a touch-screen monitor, and the like), enabling a user of the client device to input information to be provided to the central server 450. For example, a user of the client device 440A may use the client device to input (e.g., review, validate, set, and the like) data for a well completion operation performed by the mobile fracturing system 402 (e.g., maintenance event data, operating condition data, well completion design data). The client devices 440 may also include a display configured to display information received from the central server 450 (e.g., predicted component life interval data).

The central server 450 may be a computing system located remotely from the mobile fracturing system 402. In some embodiments, the central server is a web server or other computer configured to receive data from and/or send data to the mobile fracturing system 402 (e.g., a data van), and further receive data from and/or send data to the one or more client devices 440. In some embodiments, the central server 450 receives the sensor data from the sensors 415 of the mobile fracturing system 402, and the data (e.g., maintenance event data, operating condition data, well completion design data) from the one or more client devices 440. The central server 450 includes an interface engine 452, a tracking module 454, a maintenance prediction model 456, a notification engine 458, a predictive block maintenance model 460, and a database 465. In other embodiments, the central server 450 may include fewer, different, or additional components than those illustrated in FIG. 4.

The interface engine 452 may be configured to generate one or more interfaces for viewing by a user (e.g., a user of the client device 440, a user of the central server 450). The user can be an individual associated with the mobile fracturing system 402, an individual associated with the environment 400, or any other suitable individual. The interface engine 452 can be used by the user to input the maintenance event data, the operating condition data, the well completion design data, and the like. The maintenance event data may indicate maintenance work (e.g., component replacement or service) performed on one or more identified components 410 of the mobile fracturing system 402. The maintenance event data may further indicate whether the maintenance event was a scheduled maintenance event or an unscheduled maintenance event in response to a failure condition. The maintenance event data may also indicate the operating condition corresponding to the component at the time of the maintenance event (e.g., fluid type, sand type, flow rate, pump pressure, and the like). The well completion design data (see FIGS. 6-7) may indicate a well completion design (e.g., block schedule, zipper schedule) to be used for executing a well completion operation. The operating condition data may indicate an operating condition for a current well completion operation. For example, the operating condition may dictate the fluid type (e.g., clean, or fresh water, dirty or produce water), the sand type, the pump rate, the pump pressure, and the like to be used for the current well completion operation.

The tracking module 454 may be configured to receive the sensor data from the sensors 415 of the mobile fracturing system 402, and based on the sensor data, track in real-time, and for each component 410, current component life or usage information as the component 410 is used in the frac fleet for one or more well completion operations. For example, the tracking module 454 may track a number of pump strokes and/or a number of barrels of fluid pumped by the component 410 since a last maintenance event of the component 410, and store this information in the database 465 as pump maintenance data 470.

Based on the data from the user received by the interface engine 452 and based on the component usage information tracked by the tracking module 454, the central server 450 generates pump maintenance data 470 for each of a plurality of well completion operations performed by the mobile fracturing system 402. As explained previously, the pump maintenance data 470 may include, for each component 410 of each frac pump 405 of the system 402, usage data indicating the actual component life intervals of the component 410. In some embodiments, the actual component life intervals may be measured as a number of pump strokes, a number of pump barrels, and the like. Thus, for example, the pump maintenance data 470 may indicate for each well completion operation, the number of times a particular component 410 (e.g., assembly, sub-assembly, individual component) of a particular frac pump 405 (or of a particular frac pump transport) has been subject to a maintenance event (e.g., replaced, serviced, and the like), the actual life interval (e.g., measured as a number of pump strokes) of the particular component 410 between the maintenance event intervals, whether each such maintenance event for the particular component 410 was a scheduled maintenance event or an unscheduled maintenance event (e.g. due to failure of the particular component 410), the operating conditions associated with the particular component 410 for each actual life interval, and the like.

The statistical analysis module 480 may be configured to access the pump maintenance data 470 and generate the maintenance prediction model 456 based on the pump maintenance data 470. To generate the maintenance prediction model 456, the statistical analysis module 480 may utilize an algorithmic approach including statistical normalization or regression techniques known in the art. In some embodiments, statistical analysis module 480 may statistically analyze by component type, the actual component life intervals (included in the pump maintenance data 470) for each of a plurality of components 410 (e.g., assembly, sub-assembly, individual component) of each of the plurality of frac pumps 405 for a plurality of past well completion operations by, e.g., plotting the actual component life intervals for the component (or component type) on a histogram and normalizing the values over a bell curve. The statistical analysis module 480 may determine the predicted component life interval for each component (or each component type) based on the statistical analysis and include the results into the maintenance prediction model 456.

In some embodiments, the statistical analysis module 480 may also take the operating conditions for each well completion operation included in the pump maintenance data 470 into account when plotting the actual component life intervals for the different components (or different component types) of the frac pump 405. Thus, for example, for a plurality of valves and seats of the fluid end assembly of each frac pump 405, the statistical analysis module 480 may determine, based on the corresponding histogram of actual life intervals of the valves and seats of each frac pump 405 over plural past well completion operations and corresponding different operating conditions, what the predicted life interval for the valves and seats will be for a current well completion operation, based on the current operating condition. For example, based on the actual component life intervals of the discharge valves and seats for the frac pumps 405 for a plurality of past well completion operations and corresponding operating conditions, the statistical analysis module 480 may determine that the predicted component life interval for the discharge valves and seats for the frac pumps 405 should be 40,000 barrels for one operating condition (e.g., when the valves and seats are pumping produce or dirty water), and determine the predicted component life interval for the discharge valves and seats for the frac pumps 405 should be 125,000 barrels for another operating condition (e.g., when the valves and seats are pumping clean or fresh water). The statistical analysis module 480 may include in the maintenance prediction model 456, similar life predictions for each of the plurality of components (or types of components) 410 as a function of the operating condition.

In addition, or in the alternate, the machine learning engine 485 may be configured to access the pump maintenance data 470 and generate the maintenance prediction model 456 based on the accessed pump maintenance data 470. The machine learning engine 485 can provide functionality similar to that discussed above with respect to statistical analysis module 480 but using artificial intelligence and machine learning techniques. For example, the machine learning engine 485 may use the pump maintenance data 470 as training data (e.g., analyze the data) to train one or more machine-learned models based on the training data. The maintenance prediction model 456 may then be generated based on the one or more machine-learned models trained by the machine learning engine 485. The machine-learned models may be trained to output the predicted component life intervals for each of the types of components 410 of the frac pumps 405 as a function of the operating condition based on corresponding actual component life intervals of the components in past well completion operations of the mobile fracturing system 402 and corresponding past operating conditions. The machine-learned models may thus be configured to accept as input a current operating condition for a current well completion operation and output the predicted component life intervals for each of the plurality of components 410 (or types of components 410) of the frac pumps 405. Upon training the machine-learned models, the machine learning engine 485 can provide the machine-learned models to the central server 450 as the maintenance prediction model 456 for storage and/or distribution to the mobile fracturing system 402 and/or the client devices 440, or for generating an interface (FIG. 5) for presenting predictions to the user.

Although illustrated as standalone components in FIG. 4, the machine learning engine 485 and/or the statistical analysis module 480 can be implemented within a computing system, such as a server or a personal computer, or can be implemented within the central server 450, the client devices 440, or the mobile fracturing system 402. The interface engine 452 may be configured to apply the maintenance prediction model 456 for the current well completion operation to generate the predicted component life intervals for each of the plurality of components 410 of the frac fleet 402 based on the current operating condition.

Figure 5:
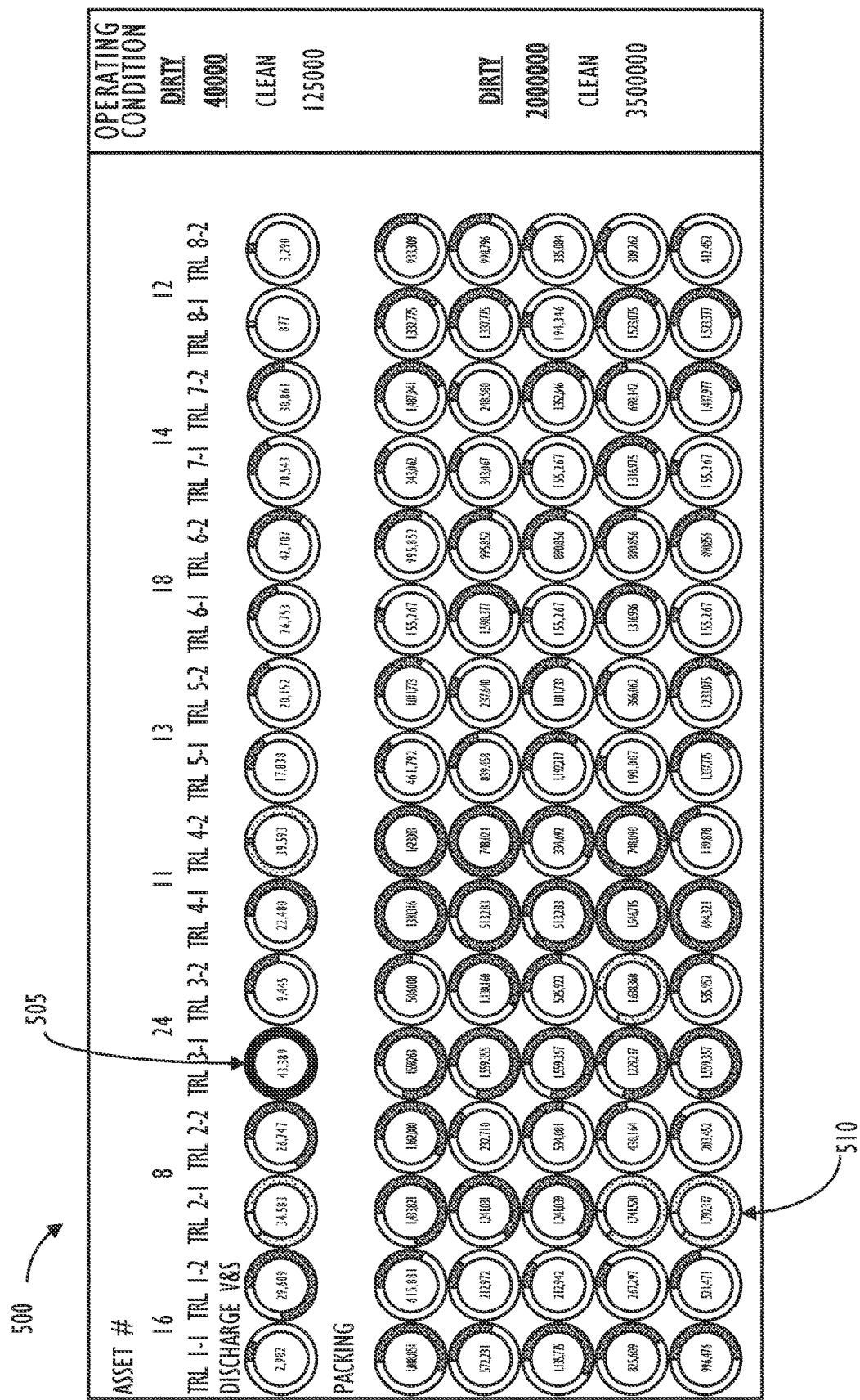
FIG. 5 illustrates an exemplary user interface showing predicted component life intervals and corresponding tracked current component life for a plurality of components of a plurality of frac pumps.

FIG. 5 illustrates an exemplary user interface 500 showing predicted component life intervals and corresponding tracked current component life for a plurality of components of a plurality of frac pumps. The interface engine 452 may be configured to generate the user interface 500 for a current well completion operation based on the data generated by the maintenance prediction model 456 as well as the current component life tracked by the tracking module 454 for a current well completion operation. In the exemplary user interface 500 shown in FIG. 5, data corresponding to each of a plurality of frac pumps (e.g., TRL 1-1, TRL 1-2, TRL 8-2) of each of a plurality of frac pump transports (e.g., Asset #16, Asset #8, . . . , Asset #12) of a frac fleet is presented to the user. The exemplary data shown in FIG. 5 corresponds to, for each frac pump, the current component life and the corresponding predicted component life interval of the discharge valves and seats of the frac pump, and the current component life and the corresponding predicted component life interval of each of the plurality of packings of the frac pump. For each type of component (e.g., discharge valves and seats, and packings) the user interface shows the predicted component life interval for different operating conditions (e.g., for the discharge valves and seats, the predicted component life interval of 40000 barrels for dirty fluid type and 125000 barrels for clean fluid type, and for each of the plurality of packings, the predicted component life interval of 2000000 pump strokes for the dirty fluid type and 3500000 pump strokes for the clean fluid type). For each component, based on the predicted component life interval for the corresponding component type, and based on the corresponding current component life, a visual indicator (e.g., circular progress bar) is presented to the user so as to provide a visual notification of a remaining component life interval of the component and indicate when the tracked current component life will reach or has reached the predicted component life interval for the current operating condition.

For example, as shown in FIG. 5, for the component type "Discharge Valves and Seats" for frac pump "TRL 3-1" of frac pump transport "24", the tracked current component life (43,389 barrels) has already reached the predicted component life interval (40000 barrels) for the current operating condition ("Dirty") for the component type "Discharge Valves and Seats". As a result, as shown in FIG. 5, a visual indicator 505 is presented corresponding to this component on the user interface 500 to visually notify the user of its end of life. As another example, as shown in FIG. 5, for the component type "Packing" for the 5th cylinder of the quintuplex frac pump "TRL 2-1" of frac pump transport "8", the tracked current component life (1,792,317 strokes) is about to reach (e.g., within a predetermined threshold) the predicted component life interval (2000000 strokes) for the current operating condition ("Dirty") for the component type "Packing". As a result, as shown in FIG. 5, a visual indicator 510 is presented corresponding to this component on the user interface 500 to visually notify the user of its upcoming end of life. As shown in FIG. 5, visual indicators 505 and 510 may be displayed in a conspicuous manner to easily draw the user's attention.

Returning to FIG. 4, based on the tracked current component life having reached the predicted component life interval (e.g., at 505 in FIG. 5) for a given component, the notification engine 458 may be configured to notify a user (e.g., user associated with one or more of client devices 440, central server 450, and mobile fracturing system 402) of a maintenance event for the given component. For example, the notification may include sending a notification to the client device 440 associated with a user or a group of users tasked with performing the maintenance event for the component 410. A user interface controlled by the interface engine 452 can display the notifications generated by and/or received from the notification engine 458, for instance within a notification feed, as pop-up windows, using icons within a frac fleet control interface, and the like.

The tracking module 454 may further be configured to track a number of maintenance events that have been performed for each component 410 (based on the pump maintenance data 470), and the notification engine 458 may be configured to determine whether for a given component 410, the number of the maintenance events has reached a predetermined number within one of a predetermined time period and a predetermined number of well completion operations. In response to determining that the number of the maintenance events has reached the predetermined number, the notification engine 458 may be configured to notify the user to of a root cause analysis event for the given component. For example, if a particular consumable component or group of components associated with a particular frac pump or frac pump transport fails prematurely, the notification engine 458 can notify an operator of the premature failure as an outlier component to be investigated further. As another example, if a particular consumable component (e.g., a particular set of valves and seals of a particular frac pump) keeps failing prematurely repeatedly (thereby requiring unscheduled maintenance and causing generation of corresponding maintenance event data received by the central server 450 via the interface engine 452), it may signal an underlying cause (e.g., another malfunctioning component, or other factor) that is causing the particular consumable component to fail repeatedly. By tracking the maintenance event data and causing the notification engine 458 to trigger a root cause analysis event, an operator can perform adequate analysis to identify the root cause and prevent such repeated failures in the future. Thus, the maintenance prediction model and the macro- and micro-level end-of-life predictions for pump trailer components (e.g., consumables, mechanical equipment, electrical equipment) can provide additional advantages. For example, the analytical data can assist in identifying anomalies associated with specific consumables or other pieces of equipment that regularly fail sooner than the expected end-of-life, thereby triggering a notification to an operator to look for underlying issues causing the repeated failures.

After completion of the current well completion operation, based on the data (e.g., maintenance event data, operating condition data, well completion design data) from the user received by the interface engine 452 and based on the component usage information tracked by the tracking module 454 for the current well completion operation, the central server 450 may update the pump maintenance data 470, and the statistical analysis module 480 and/or the machine learning engine 485 may access the updated pump maintenance data 470 to update and regenerate the maintenance prediction model 456 to be used for future well completion operations.

The central server 450 may thus implement a pump maintenance application that captures quantitative data related to the power end assembly, the fluid end assembly, and consumable components of the fluid end assembly at a highly granular level. For example, the pump maintenance application captures usage data for each consumable component of the fluid end assembly using sensors, and further captures preventative and/or failure maintenance data (e.g., via user input) for each pump for a plurality of jobs. The pump maintenance application thus may provide interval-of-life (actual life) and interval-of-maintenance data for components of the frac pump down to a granular level. Using the data captured by the pump maintenance application, the maintenance prediction model can be built to perform predictive analytics. The model can be algorithmically generated and/or use AI/ML techniques to generate component-level end-of-life predictions. The model may generate a highly refined expectation and measurement of end-of-life for each component (e.g., down to stroke-level or barrel-level) or type of component, and present that information visually on a user interface for an operator to provide an information-rich "birds-eye" view of the whole fleet.

The central server 450 may further generate the predictive block maintenance model 460 based on well completion design data 475, the predicted component life intervals from the maintenance prediction model 456, and the tracked current component life or usage information for each component 410 from the tracking module 454. The well completion design data 475 may include information regarding hydraulically fracking a number of wells at a well pad, a number of fracking stages for each well, an operating condition (e.g., fluid type, sand type, fluid pressure) for fracking each stage of each well, a number of barrels to be pumped for fracking each stage of each well, the amount of time permitted for fracking each stage, and the like. A non-limiting example of a well completion design (e.g., zipper schedule or block schedule) is described below in connection with FIG. 6.

FIG. 6 illustrates an exemplary user interface 600 showing a well completion design 610 for a frac fleet to perform a well completion operation. The well completion operation corresponding to the well completion design 610 may be performed by the hydraulic fracturing system 402 of FIG. 4 (or the hydraulic fracturing system 103 of FIG. 1). The well completion design 610 may be provided to the operator of the hydraulic fracturing system to perform hydraulic fracturing for the plurality of wells at the wellsite where the hydraulic fracturing system is located. As shown in FIG. 6, the well completion design 610 includes instructions for hydraulically fracking three wells (Well A, Well B, Well C) over total 20 stages, each stage having a predetermined design time (e.g., fracking duration measured in hours). The well completion design 610 further specifies the order in which the three wells are to be fracked, the number of frac stages for each of the three wells, and the number of barrels of frac fluid to be pumped for each well at each stage. Although not specifically shown in FIG. 6, the well completion design 610 may also include additional information like the operating condition (e.g., the fluid type, the sand type, fluid pressure, and the like) for fracking each stage of each well.

During the well completion operation for the well completion design 610 using conventional techniques, the operator may have to stop the fracking after each stage to perform maintenance operations for different components of different frac pumps or pump transports. For example, after completion of stage one per the well completion design 610 where Well A is fracked based on the parameters specified in the design, the fracking operation may be stopped for a predetermined amount of time to perform maintenance on the frac pump components, and then the fracking operation may be performed for stage two per the well completion design 610, and so on. As explained previously, such an approach leads to several inefficiencies such as increased NPT or downtime, failure-based maintenance rather than preventative maintenance, lack of synchronized maintenance on multiple components of multiple frac pumps at the same time.

To overcome the above problems, the central server 450 according to the present disclosure implements the predictive block maintenance model 460 that is configured to access the well completion design data 475, and access the predicted component life intervals from the maintenance prediction model 456, and the tracked current component life or usage information for each component 410 from the tracking module 454, to output an updated well completion design for performing predictive block maintenance by including one or more continuous well completion events in the well completion design. In some embodiments, the predictive block maintenance model 460 may be developed using algorithmic techniques. In other embodiments, predictive block maintenance model 460 may be implemented as a machine-learned model using AI and machine learning techniques.

Based on the well completion design 610, the predictive block maintenance model 460 may be configured to first identify pump metrics or parameters (e.g., measured in barrels, strokes, and the like; estimated pump count value) for completing each of the plurality of stages of the well completion design 610 based on the specified stage parameters. The predictive block maintenance model 460 may further be configured to access or determine the remaining component life intervals (e.g., measured in barrels, strokes, and the like) for the plurality of components 410 of the plurality of frac pumps 405 of the mobile fracturing system 402 that are being operated to execute the well completion design 610. The remaining component life intervals for the plurality of components 410 may be determined (e.g., as a number of pump strokes, a number of pump barrels, and the like) based on corresponding predicted component life intervals output from the maintenance prediction model 456 and corresponding tracked current component life or usage information determined by the tracking module 454 based on the sensor data from sensors 415. Based on the remaining component life intervals for the plurality of components 410, the predictive block maintenance model 460 may set a continuous completion event for the well completion operation. The continuous completion event may identify a number of contiguous stages from among the plurality of stages of the well completion design 610 that the mobile fracturing system 402 will be able to complete before maintenance will be required for one or more of the plurality of components 410.

In setting the continuous completion event, the predictive block maintenance model 460 may identify one or more of the plurality of components 410 whose respective predicted component life interval is going to be reached within a predetermined threshold range of the end of the identified number of contiguous stages of the plurality of stages of the well completion design 610 (e.g., estimated pump count value corresponding to the identified number of contiguous stages within a predetermined threshold of the remaining component life interval of the identified one or more of the plurality of components 410). The predictive block maintenance model 460 may further be configured to identify the particular components 410 and the particular frac pumps 405 and the particular frac pump transports of the system 402 corresponding to the particular components 410 whose predicted component life interval is expected to be reached at the end of the contiguous number of stages. The predictive block maintenance model 460 may utilize the information regarding the particular identified components 410 to generate the updated well completion design, and for example, present that information to a user for performing predictive block maintenance for the well completion design.

FIG. 7 illustrates an exemplary user interface 700 showing an updated well completion design 710 corresponding to the well completion design 610 of FIG. 6. The updated well completion design 710 may be generated by the predictive block maintenance model 460. In some embodiments, the interface engine 452 may control to present the user interface 700 showing the updated well completion design 710 to a user of the client device 440 to allow the user to perform block maintenance based on the updated well completion design 710. As shown in the example of FIG. 7, the updated well completion design 710 includes a continuous completion event set by the predictive block maintenance model 460. The continuous completion event includes a continuous pumping block 715 and a maintenance block 720, the continuous pumping block 715 identifying one or more contiguous stages (e.g., 15 stages in the example of FIG. 7) from among the plurality of stages (e.g., 20 stages in the example of FIG. 7) during which the well completion operation is performed with the frac fleet. The continuous completion event further includes the maintenance block 720 identifying one or more of the plurality of frac pump transports (e.g., frac pump transports corresponding to frac pumps #003 and 007 in the example of FIG. 7) to be subject to predetermined maintenance operations (e.g., maintenance event for replacing valves, seats, and packings for frac pumps #003 and 007) upon completion of the one or more contiguous stages of the continuous pumping block 715.

In some embodiments, the predictive block maintenance model 460 may further be configured to generate the updated well completion design in real-time so that in response to determining that the well completion design data 475 (e.g., corresponding to the input well completion design 610) has changed (e.g., extra stage added, operating conditions for an existing stage changed, and the like), the predictive block maintenance model 460 may automatically generate a new updated well completion design to account for the modification of the well completion design data 475 so that the maintenance block 720 is inserted precisely into the schedule after completion of an appropriate number of the stages of the modified well completion design.

By intelligently utilizing the granular component-level predicted component life interval data from the pump maintenance application, the system is able to set the continuous pumping block 715 to continuously pump as many stages as possible without stopping for maintenance. The system is further able to automatically identify components that will need maintenance at the end of the continuous pumping block and preschedule such maintenance event in advance, thereby increasing well completion operation efficiency, reducing overall downtime, and increasing the efficiency during the downtime corresponding to the maintenance block 720 where multiple identified components of multiple frac pumps of multiple frac pump transports may all be operated upon for performing maintenance at the same time. By implementing the predictive block maintenance model 460, continuous pumping blocks for frac jobs based on customer job design can be lengthened, and intermittent preventative maintenance blocks can be scheduled with high accuracy and over longer intervals.

As noted above, the systems of FIG. 4 are configured to communicate via a network 490, which may include any combination of local area and/or wide area networks, using both wired and/or wireless communication systems. In one embodiment, the network 490 uses standard communications technologies and/or protocols. For example, the network 490 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 490 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 490 may be represented using any suitable format, such as hypertext markup language (HTML) or extensible markup language (XML). In some embodiments, all or some of the communication links of the network 490 may be encrypted using any suitable technique or techniques.

FIG. 8 is a flowchart illustrating a process 800 for predicting frac pump component life intervals, in accordance with one or more embodiments. It should be noted that the process illustrated herein can include fewer, different, or additional steps in other embodiments. The Central server 450 may access 810 pump maintenance data 470 associated with each of a plurality of components 410 of each of a plurality of frac pumps 405 of each of a plurality of frac pump transports of a frac fleet (e.g., mobile fracturing system 402 or 103). The pump maintenance data 470 includes usage data of a plurality of well completion operations performed by the frac fleet 402. The usage data indicates actual component life intervals of each of the plurality of components 410 and corresponding operating conditions.

The central server 450 may analyze 820 the pump maintenance data 470 to generate a maintenance prediction model 456. The maintenance prediction model being configured to output for each of the plurality of components 410, a predicted component life interval as a function of an operating condition. The central server 450 may access 830 a current operating condition corresponding to a current well completion operation of the frac fleet. The central server 450 may apply 840 the maintenance prediction model 456 to the current well completion operation to generate the predicted component life intervals for each of the plurality of components of the frac fleet based on the current operating condition (FIG. 5). The tracking module 454 may track 850 a current component life indicating usage of a given component in at least the current well completion operation based on sensor data from sensors 415. And the notification engine 458 may transmit 860 a notification indicating a maintenance event for the given component (e.g., 505 in FIG. 5) in response to determining that the tracked current component life for the given component has reached a corresponding predicted component life interval.

FIG. 9 is a flowchart illustrating a process 900 for setting a continuous completion event for a well completion design, in accordance with one or more embodiments. It should be noted that the process illustrated herein can include fewer, different, or additional steps in other embodiments. The central server 450 may access 910 well completion design data 475 for completing a plurality of stages of a well completion operation (e.g., 610, 710), the well completion operation being performed with a frac fleet (e.g., 402) including a plurality of frac pump transports, each frac pump transport including a plurality of frac pumps, and each frac pump including a plurality of components. The central server 450 may access 920 predicted component life intervals for each of the plurality of components of the frac fleet, the predicted component life intervals being obtained from a maintenance prediction model 456 associated with the frac fleet 402. The central server may determine 930 remaining component life intervals for each of the plurality of components of the frac fleet based on at least the respective predicted component life intervals. The predictive block maintenance model 460 may set a continuous completion event (e.g., 715 and 720) for the well completion operation based on the remaining component life intervals for each of the plurality of components. The continuous completion event including a continuous pumping block (e.g., 715) and a maintenance block (e.g., 720). The continuous pumping block identifying one or more contiguous stages from among the plurality of stages during which the well completion operation is performed with the frac fleet, and the maintenance block identifying one or more of the plurality of frac pumps to be subject to predetermined maintenance operations upon completion of the one or more contiguous stages of the continuous pumping block. An operator may then operate the mobile fracturing system 402 to perform 950 the well completion operation based on the set continuous pumping block and the set maintenance block.

Figure 10:
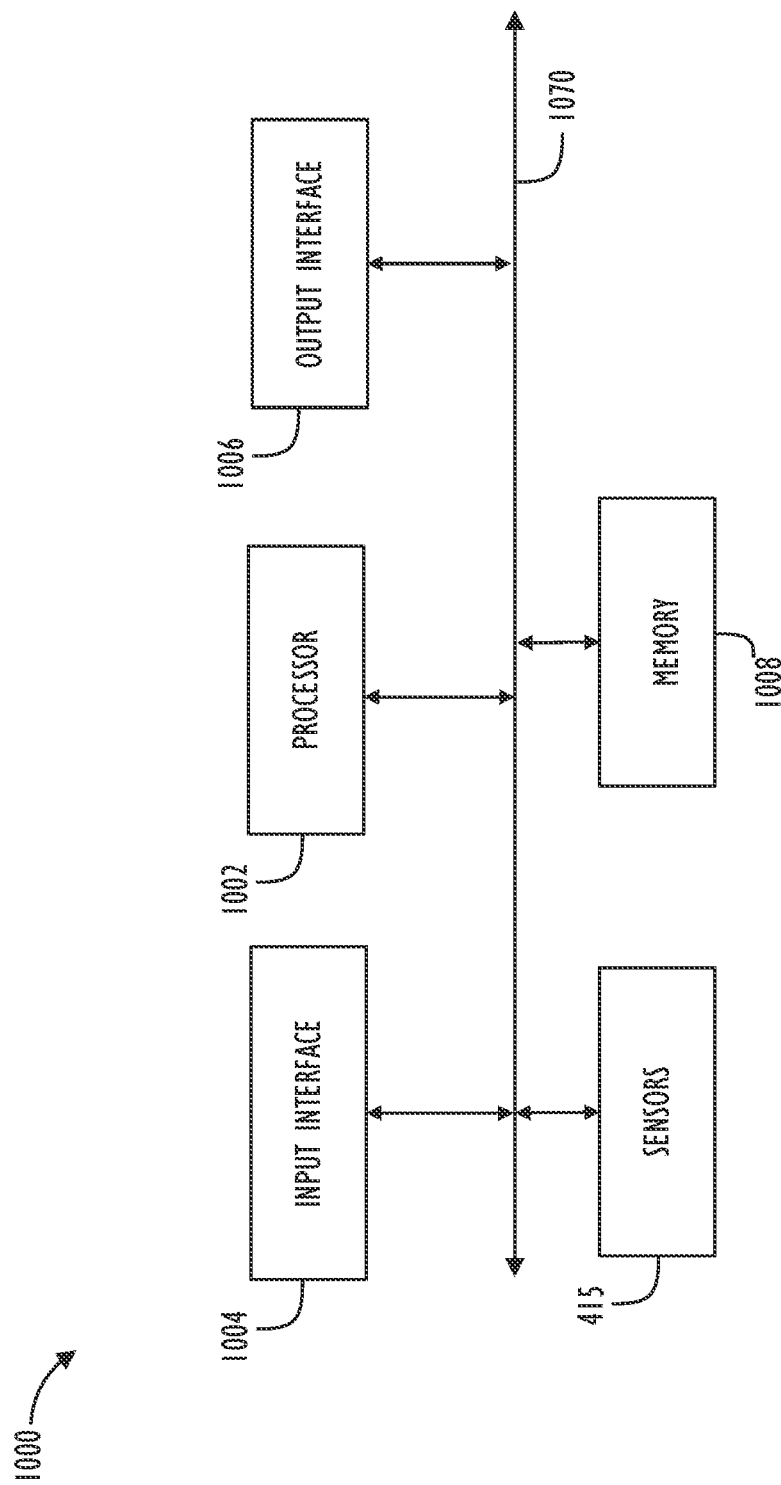
FIG. 10 shows an illustrative simplified block diagram of an exemplary computing system, in accordance with one or more embodiments.

FIG. 10 shows an illustrative simplified block diagram of computing system 1000, in accordance with one or more embodiments. The computing system 1000 may correspond to or may be part of a computer and/or any other computing device, such as a workstation, server, mainframe, supercomputer, and/or portable computing device. With reference to FIGS. 1, 2A-2B, 4, 8 and 9, computing system 1000 may be implemented in or as data van 114, control system 208, central server 450, client devices 440, machine learning engine 485, statistical analysis module 480, process 800, and process 900. The computing system 1000 comprises a processor 1002, which may also be referenced as a central processor unit (CPU). The processor 1002 (e.g., programmable control device) may communicate (e.g., via a system bus 1070) and/or provide instructions to other components within the computing system 1000, such as an input interface 1004, an output interface 1006, and/or memory 1008. In one embodiment, the processor 1002 may comprise one or more multi-core processors and/or memory mediums (e.g., cache memory) that function as buffers and/or storage for data. Additionally, the processor 1002 may be part of one or more other processing components, such as application specific integrated circuits (ASICs), field-programmable gate arrays (FPGAs), and/or digital signal processors (DSPs). Although FIG. 10 illustrates that processor 1002 may be a single processor, the processor 1002 is not so limited and instead may represent multiple processors. The processor 1002 may be configured to implement any of the operations described herein, including operations described in connection with FIGS. 4-9.

FIG. 10 illustrates that memory 1008 may be operatively coupled to processor 1002. Memory 1008 may be a non-transitory medium or non-transitory program storage device configured to store various types of data. For example, memory 1008 may include one or more memory devices that comprise secondary storage, read-only memory (ROM), and/or random-access memory (RAM). The secondary storage is typically comprised of one or more disk drives, optical drives, solid-state drives (SSDs), and/or tape drives and is used for non-volatile storage of data. In certain instances, the secondary storage may be used to store overflow data if the allocated RAM is not large enough to hold all working data. The secondary storage may also be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions.

As shown in FIG. 10, the memory 1008 may be used to house the instructions and models for carrying out various embodiments described herein. In an embodiment, the memory 1008 may comprise one or more components associated with FIGS. 4-9. Instructions and data in memory 1008 may be accessed and implemented by the processor 1002. In one embodiment, the memory 1008 may interface with the system bus 1070 (e.g., a computer bus) to communicate and/or transmit information stored in the memory 1008 to the processor 1002 during execution of software programs, such as software applications that comprise program code, and/or computer executable process steps that incorporate functionality described herein.

Persons of ordinary skill in the art are aware that software programs may be developed, encoded, and compiled in a variety of computing languages for a variety of software platforms and/or operating systems and subsequently loaded and executed by the processor 1002. In one embodiment, the compiling process of the software program, may transform program code written in a programming language to another computer language such that the processor 1002 is able to execute the programming code. For example, the compiling process of the software program may generate an executable program that provides encoded instructions (e.g., machine code instructions) for the processor 1002 to accomplish specific, non-generic, particular computing functions, such as predicting component life intervals or setting continuous completion events.

FIG. 10 also illustrates that the processor 1002 may be operatively coupled to input interface 1004 configured to receive input sensor data and/or direct-report data, and output interface 1006 configured to output and/or display an avatar model and/or perceptual data. The input interface 1004 may be configured to obtain input sensor data and/or direct-report data and/or other information via cables, connectors, wireless connections and/or other communication protocols. In one embodiment, the input interface 1004 may be a network interface that comprises multiple ports configured to receive and/or transmit data via a network. In particular, the network interface may transmit the data via wired links, wireless link, and/or logical links. Other examples of input interface 1004 may be universal serial bus (USB) interfaces, CD-ROMs, DVD-ROMs and/or connections to one or more sensors. Output interface 1006 may include to one or more connections for a graphic display (e.g., monitors), a printing device that produces hard copies of the generated results, and/or a plurality of ports that transmit data via cables, connectors, wireless connections, and/or other communication protocols. FIG. 10 also illustrates that processor 1002 may be operatively coupled to the sensors 415 to generate the sensor data corresponding to fracturing system 402.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method comprising:
    accessing well completion design data for completing a plurality of stages of a well completion operation, the well completion operation being performed with a frac fleet including a plurality of frac pump transports, each frac pump transport including a plurality of frac pumps, and each frac pump including a plurality of components;
    accessing pump maintenance data associated with the plurality of components, the pump maintenance data including usage data of a plurality of historical well completion operations performed by the frac fleet;
    analyzing the pump maintenance data to generate a maintenance prediction model, the maintenance prediction model being configured to output for each of the plurality of components, a predicted component life interval as a function of an operating condition of the well completion operation, and actual component life intervals and associated metrics of replaced components corresponding to the component, wherein the associated metrics include, for a given replaced component (i) a maintenance event metric indicating whether the given replaced component was replaced due to a preventative maintenance event or a failure maintenance event, and (ii) operating conditions during a life of the given replaced component, the operating conditions specifying frac job design metrics indicating pumping parameters associated with the given replaced component, wherein the predicted component life interval is measured in one of a number of pump strokes and a number of barrels pumped,
    determining for each of the plurality of components of the frac fleet, a remaining component life interval based on the predicted component life interval and a tracked current component life; and
    scheduling a continuous completion event for the well completion operation based on the remaining component life interval for each of the plurality of components, the continuous completion event including a continuous pumping block and a maintenance block, the continuous pumping block identifying one or more contiguous stages from among the plurality of stages during which the well completion operation is performed with the frac fleet, and the maintenance block identifying one or more of the plurality of frac pumps to be subject to predetermined maintenance operations upon completion of the one or more contiguous stages of the continuous pumping block.

2. The method of claim 1, further comprising determining an estimated pump count value for completing each of the plurality of stages of the well completion operation based on the well completion design data.

3. The method of claim 2, wherein the maintenance block identifies the one or more of the plurality of frac pumps in response to determining that the remaining component life interval of at least one of the plurality of components of each of the one or more of the plurality of frac pumps is within a predetermined threshold of estimated pump count values for completing the one or more contiguous stages of the continuous pumping block.

4. The method of claim 3, wherein the predetermined maintenance operations include a maintenance event for the at least one of the plurality of components of each of the one or more of the plurality of frac pumps.

5. The method of claim 2, wherein the remaining component life interval for each component and the estimated pump count value for each stage are measured as one of a number of pump strokes and a number of pumped barrels.

6. The method of claim 1, wherein the plurality of components include, for each of the plurality of frac pumps of the frac fleet, a plurality of valves, a plurality of seats, a plurality of seals, a plurality of packings, a plurality of packing rings, a plurality of packing nuts, a plurality of plungers, and a fluid end assembly.

7. The method of claim 1, wherein the well completion design data includes data for performing a hydraulic fracturing operation for each of a plurality of wells, and wherein each stage of the plurality of stages of the well completion design data performs the hydraulic fracturing operation for one of the plurality of wells.

8. The method of claim 1, wherein the operating condition indicates a type of fluid pumped downhole during the well completion operation.

9. The method of claim 1, wherein the tracked current component life is based on sensor output, and indicates a state of usage of the component across multiple well completion operations of the frac fleet.

10. A system for performing predictive block maintenance, the system comprising:
    a frac fleet including a plurality of frac pump transports, each frac pump transport including a plurality of frac pumps, and each frac pump including a plurality of components;
    memory; and
    one or more processors operatively coupled to the memory, the memory comprising instructions that, when executed by the one or more processors, cause the one or more processors to:
        access well completion design data for completing a plurality of stages of a well completion operation with the frac fleet;
        access pump maintenance data associated with the plurality of components, the pump maintenance data including usage data of a plurality of historical well completion operations performed by the frac fleet;
        analyze the pump maintenance data to generate a maintenance prediction model, the maintenance prediction model being configured to output for each of the plurality of components, a predicted component life interval as a function of an operating condition of the well completion operation, and actual component life intervals and associated metrics of replaced components corresponding to the component, wherein the associated metrics include, for a given replaced component (i) a maintenance event metric indicating whether the given replaced component was replaced due to a preventative maintenance event or a failure maintenance event, and (ii) operating conditions during a life of the given replaced component, the operating conditions specifying frac job design metrics indicating pumping parameters associated with the given replaced component, wherein the predicted component life interval is measured in one of a number of pump strokes and a number of barrels pumped, determine for each of the plurality of components of the frac fleet, a remaining component life interval based on the predicted component life interval and a tracked current component life; and schedule a continuous completion event for the well completion operation based on the remaining component life interval for each of the plurality of components, the continuous completion event including a continuous pumping block and a maintenance block, the continuous pumping block identifying one or more contiguous stages from among the plurality of stages during which the well completion operation is performed with the frac fleet, and the maintenance block identifying one or more of the plurality of frac pumps to be subject to predetermined maintenance operations upon completion of the one or more contiguous stages of the continuous pumping block.

11. The system of claim 10, wherein the memory further comprises instructions that, when executed by the one or more processors, cause the one or more processors to determine an estimated pump count value for completing each of the plurality of stages of the well completion operation based on the well completion design data.

12. The system of claim 11, wherein the maintenance block identifies the one or more of the plurality of frac pumps in response to determining that the remaining component life interval of at least one of the plurality of components of each of the one or more of the plurality of frac pumps is within a predetermined threshold of estimated pump count values for completing the one or more contiguous stages of the continuous pumping block.

13. The system of claim 12, wherein the predetermined maintenance operations include a maintenance event for the at least one of the plurality of components of each of the one or more of the plurality of frac pumps.

14. The system of claim 11, wherein the remaining component life interval for each component and the estimated pump count value for each stage are measured as one of a number of pump strokes and a number of pumped barrels.

15. The system of claim 10, wherein the plurality of components include, for each of the plurality of frac pumps of the frac fleet, a plurality of valves, a plurality of seats, a plurality of seals, a plurality of packings, a plurality of packing rings, a plurality of packing nuts, a plurality of plungers, and a fluid end assembly.

16. The system of claim 10, wherein the well completion design data includes data for performing a hydraulic fracturing operation for each of a plurality of wells, and wherein each stage of the plurality of stages of the well completion design data performs the hydraulic fracturing operation for one of the plurality of wells.

17. A server for performing predictive block maintenance for a frac fleet including a plurality of frac pump transports, each frac pump transport including a plurality of frac pumps, and each frac pump including a plurality of components, the server comprising:

memory; and one or more processors operatively coupled to the memory, the memory comprising instructions that, when executed by the one or more processors, cause the one or more processors to:

receive, from a client device, well completion design data for completing a plurality of stages of a well completion operation with the frac fleet;

access pump maintenance data associated with the plurality of components, the pump maintenance data including usage data of a plurality of historical well completion operations performed by the frac fleet;

analyze the pump maintenance data to generate a maintenance prediction model, the maintenance prediction model being configured to output for each of the plurality of components, a predicted component life interval as a function of an operating condition of the well completion operation, and actual component life intervals and associated metrics of replaced components corresponding to the component, wherein the associated metrics include, for a given replaced component (i) a maintenance event metric indicating whether the given replaced component was replaced due to a preventative maintenance event or a failure maintenance event, and (ii) operating conditions during a life of the given replaced component, the operating conditions specifying frac job design metrics indicating pumping parameters associated with the given replaced component, wherein the predicted component life interval is measured in one of a number of pump strokes and a number of barrels pumped, determine for each of the plurality of components of the frac fleet, a remaining component life interval based on the predicted component life interval and a tracked current component life;

schedule a continuous completion event for the well completion operation based on the remaining component life interval for each of the plurality of components, the continuous completion event including a continuous pumping block and a maintenance block, the continuous pumping block identifying one or more contiguous stages from among the plurality of stages during which the well completion operation is performed with the frac fleet, and the maintenance block identifying one or more of the plurality of frac pumps to be subject to predetermined maintenance operations upon completion of the one or more contiguous stages of the continuous pumping block; and transmit the continuous completion event for the well completion operation to the client device.

* * * * *